US012574099B2

(12) United States Patent
Alawieh et al.

(10) Patent No.: US 12,574,099 B2
(45) Date of Patent: Mar. 10, 2026

(54) APPARATUS AND METHOD FOR TRANSMITTING OR RECEIVING A BEAM DIRECTION CONFIGURATION

(71) Applicant: Fraunhofer-Gesellschaft zur Förderung der angewandten Forschung e.V., Munich (DE)

(72) Inventors: Mohammad Alawieh, Erlangen (DE); Sutharshun Varatharaajan, Erlangen (DE); Marcus Großmann, Erlangen (DE)

(73) Assignee: FRAUNHOFER-GESELLSCHAFT ZUR FÖRDERUNG DER ANGEWANDTEN FORSCHUNG E.V., Munich (DE)

( * ) Notice: Subject to any disclaimer, the term of this patent is extended or adjusted under 35 U.S.C. 154(b) by 342 days.

(21) Appl. No.: 18/475,365

(22) Filed: Sep. 27, 2023

(65) Prior Publication Data

US 2024/0022310 A1     Jan. 18, 2024

Related U.S. Application Data

(63) Continuation of application No. PCT/EP2022/058712, filed on Mar. 31, 2022.

(30) Foreign Application Priority Data

Apr. 1, 2021    (EP) .................................... 21166802

(51) Int. Cl.
*H04B 7/08*        (2006.01)
*H04W 72/044*    (2023.01)

(52) U.S. Cl.
CPC .......... *H04B 7/086* (2013.01); *H04W 72/046* (2013.01)

(58) Field of Classification Search
CPC ...... H04B 7/086; H04B 7/0617; H04B 7/088; H04B 7/06952; H04W 72/046;
(Continued)

(56) References Cited

U.S. PATENT DOCUMENTS

2019/0199496 A1*  6/2019  Qin ........................ H04W 72/23

FOREIGN PATENT DOCUMENTS

JP        2004-235899 A      8/2004
JP        2019-533950 A      11/2019
(Continued)

OTHER PUBLICATIONS

International Search Report and Written Opinion issued in application No. PCT/EP2022/058712.
"3rd Generation Partnership Project, 5G; NR; Radio Resource Control (RRC); Protocol specification;" TS38.331 v16.1.0; Jul. 2020; pp. 1-886.
"3rd Generation Partnership Project, LTE; 5G; LTE Positioning Protocol (LPP);" TS37.355 v16.1.0; Jul. 2020; pp. 1-294.
(Continued)

*Primary Examiner* — Ankur Jain
(74) *Attorney, Agent, or Firm* — McClure, Qualey & Rodack, LLP

(57)        ABSTRACT

An apparatus for transmitting and receiving data in a wireless communication system according to an embodiment is provided, configured to receive a first message and/or a second message from a further network entity, and configured to determine one or more transmit spatial filters and/or one or more receive spatial filters and/or one or more beam directions; wherein the transmit spatial filters and/or the receive spatial filters are identical to at least one initial spatial filter or are derived by the apparatus from the at least one initial spatial filter; wherein the beam directions are identical to at least one initial beam direction or are derived by the apparatus from the at least one initial beam direction. Furthermore, the apparatus is configured to apply the transmit spatial filters and/or the receive spatial filters and/or the beam directions on one or more downlink resources and/or on one or more uplink resources.

16 Claims, 10 Drawing Sheets

(58) Field of Classification Search
CPC ..... H04W 24/02; H04W 24/10; H04W 64/00;
H04W 4/02; H04W 24/08; G01S 5/0036;
G01S 5/0218; G01S 5/0236; G01S
5/0284; H04L 5/0023; H04L 5/0053;
H04L 5/0094; H04L 5/0048
See application file for complete search history.

(56) References Cited

FOREIGN PATENT DOCUMENTS

| | | | |
|---|---|---|---|
| WO | 2020/089276 | A1 | 5/2020 |
| WO | 2021/006796 | A1 | 1/2021 |

OTHER PUBLICATIONS

"3rd Generation Partnership Project 5G; NG-RAN; NR Positioning Protocol A (NRPPa);" TS38.455 v16.0.0; Sep. 2020; pp. 1-61.
Fraunhofer IIS, et al.; "NR beam management supporting multi-gNB measurements for positioning;" 3GPP TSG RAN WG1 Meeting #95; Nov. 2018; pp. 1-8.
"3rd Generation Partnership Project; Technical Specification Group Radio Access Network; NG-RAN; NR Positioning Protocol A (NRPPa) (Release 16);" Jan. 2021; pp. 1-152.
Japanese language office action dated Dec. 9, 2024, issued in application No. JP 2023-560900.
English language translation of office action dated Dec. 9, 2024 (pp. 1-3 of attachment).

* cited by examiner

100

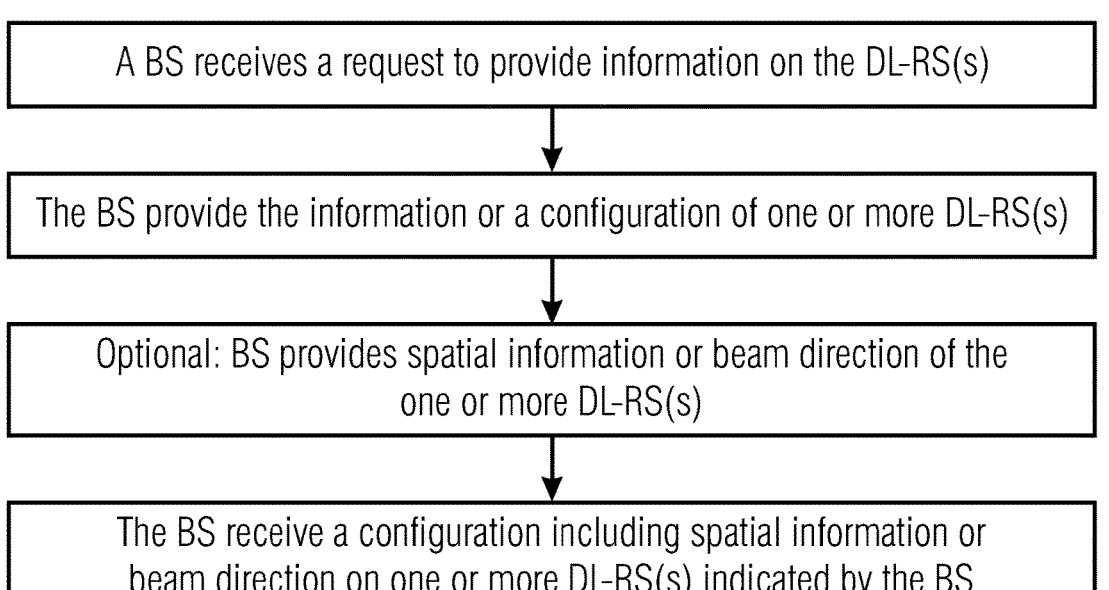

A BS receives a request to provide information on the DL-RS(s)

The BS provide the information or a configuration of one or more DL-RS(s)

Optional: BS provides spatial information or beam direction of the one or more DL-RS(s)

The BS receive a configuration including spatial information or beam direction on one or more DL-RS(s) indicated by the BS

Fig. 7

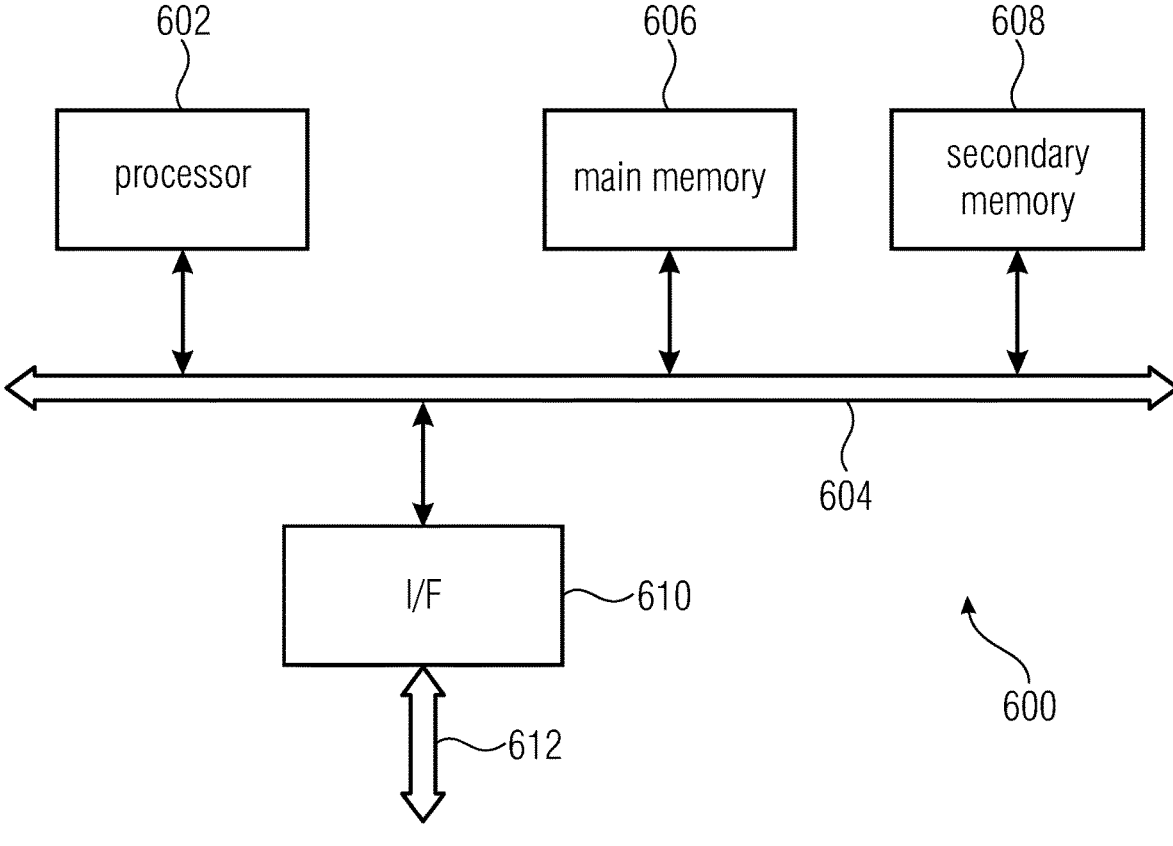

602 processor 606 main memory 608 secondary memory

APPARATUS AND METHOD FOR TRANSMITTING OR RECEIVING A BEAM DIRECTION CONFIGURATION

CROSS-REFERENCE TO RELATED APPLICATIONS

This application is a continuation of copending International Application No. PCT/EP2022/058712, filed Mar. 31, 2022, which is incorporated herein by reference in its entirety, and additionally claims priority from European Application No. 21166802.5, file Apr. 1, 2021, which is also incorporated herein by reference in its entirety.

TECHNICAL FIELD

The present invention relates to the field of wireless communication systems or networks, more specifically to transmitting or receiving a beam direction configuration in such a network.

BACKGROUND OF THE INVENTION

FIGS. 1(a) and 1(b) show an example of a terrestrial wireless network 100 including, as is shown in FIG. 1(a), the core network 102 and one or more radio access networks $RAN_1$, $RAN_2$, . . . $RAN_N$ (RAN=Radio Access Network). FIG. 1(b) is a schematic representation of an example of a radio access network RAND that may include one or more base stations $gNB_1$ to $gNB_5$ (gNB=next generation Node B), each serving a specific area surrounding the base station schematically represented by respective cells $106_1$ to $106_5$. The base stations are provided to serve users within a cell. The one or more base stations may serve users in licensed and/or unlicensed bands. The term base station, BS, refers to a gNB in 5G networks, an eNB in UMTS/LTE/LTE-A/ LTE-A Pro, or just a BS in other mobile communication standards. A user may be a stationary device or a mobile device. The wireless communication system may also be accessed by mobile or stationary IoT (Internet of Things) devices which connect to a base station or to a user. The mobile devices or the IoT devices may include physical devices, ground based vehicles, such as robots or cars, aerial vehicles, such as manned or unmanned aerial vehicles, UAVs, the latter also referred to as drones, buildings and other items or devices having embedded therein electronics, software, sensors, actuators, or the like as well as network connectivity that enables these devices to collect and exchange data across an existing network infrastructure. FIG. 1(b) shows an exemplary view of five cells, however, the RAND may include more or less such cells, and RAND may also include only one base station. FIG. 1(b) shows two users $UE_1$ and $UE_2$, (UE=User Equipment) also referred to as user equipment, UE, that are in cell $106_2$ and that are served by base station $gNB_2$. Another user $UE_3$ is shown in cell $106_4$ which is served by base station $gNB_4$. The arrows $108_1$, $108_2$ and $108_3$ schematically represent uplink/downlink connections for transmitting data from a user $UE_1$, $UE_2$ and $UE_3$ to the base stations $gNB_2$, $gNB_4$ or for transmitting data from the base stations $gNB_2$, $gNB_4$ to the users $UE_1$, $UE_2$, $UE_3$. This may be realized on licensed bands or on unlicensed bands. Further, FIG. 1(b) shows two IoT devices $110_1$ and $110_2$ in cell $106_4$, which may be stationary or mobile devices. The IoT device $110_1$ accesses the wireless communication system via the base station $gNB_4$ to receive and transmit data as schematically represented by arrow $112_1$. The IoT device $110_2$ accesses the wireless communication system via the user $UE_3$ as is schematically represented by arrow $112_2$. The respective base stations $gNB_1$ to $gNB_5$ may be connected to the core network 102, e.g. via the S1 interface, via respective backhaul links $114_1$ to $114_5$, which are schematically represented in FIG. 1(b) by the arrows pointing to "core". The core network 102 may be connected to one or more external networks. The external network may be the Internet or a private network, such as an intranet or any other type of campus networks, e.g. a private WiFi or 4G or 5G mobile communication system. Further, some or all of the respective base stations $gNB_1$ to $gNB_5$ may be connected, e.g. via the S1 or X2 interface or the XN interface in NR (New Radio), with each other via respective backhaul links $116_1$ to $116_5$, which are schematically represented in FIG. 1(b) by the arrows pointing to "gNBs". A sidelink channel allows direct communication between UEs, also referred to as device-to-device, D2D (Device to Device), communication. The sidelink interface in 3GPP (3G Partnership Project) is named PC5 (Proximity-based Communication 5). For data transmission a physical resource grid may be used. The physical resource grid may comprise a set of resource elements to which various physical channels and physical signals are mapped. For example, the physical channels may include the physical downlink, uplink and sidelink shared channels, PDSCH (Physical Downlink Shared CHannel), PUSCH (Physical Uplink Shared Channel), PSSCH (Physical Sidelink Shared Channel), carrying user specific data, also referred to as downlink, uplink and sidelink payload data, the physical broadcast channel, PBCH (Physical Broadcast Channel), carrying for example a master information block, MIB, and one or more of a system information block, SIB, one or more sidelink information blocks, SLIBs, if supported, the physical downlink, uplink and sidelink control channels, PDCCH (Physical Downlink Control Channel), PUCCH (Physical Uplink Control CHannel), PSSCH, carrying for example the downlink control information, DCI, the uplink control information, UCI, and the sidelink control information, SCI, and physical sidelink feedback channels, PSFCH (Physical sidelink feedback channel), carrying PC5 feedback responses. Note, the sidelink interface may support a 2-stage SCI (Speech Call Items). This refers to a first control region containing some parts of the SCI, and, optionally, a second control region, which contains a second part of control information.

For the uplink, the physical channels may further include the physical random-access channel, PRACH (Packet Random Access Channel) or RACH (Random Access Channel), used by UEs for accessing the network once a UE synchronized and obtained the MIB and SIB. The physical signals may comprise reference signals or symbols, RS, synchronization signals and the like. The resource grid may comprise a frame or radio frame having a certain duration in the time domain and having a given bandwidth in the frequency domain. The frame may have a certain number of subframes of a predefined length, e.g. 1 ms. Each subframe may include one or more slots of 12 or 14 OFDM symbols (OFDM=Orthogonal Frequency-Division Multiplexing) depending on the cyclic prefix, CP, length. A frame may also include of a smaller number of OFDM symbols, e.g. when utilizing a shortened transmission time interval, sTTI (slot or subslot transmission time interval), or a mini-slot/non-slot-based frame structure comprising just a few OFDM symbols.

The wireless communication system may be any single-tone or multicarrier system using frequency-division multiplexing, like orthogonal frequency-division multiplexing, OFDM, or orthogonal frequency-division multiple access, OFDMA (Orthogonal frequency-division multiple access), or any other IFFT-based signal (IFFT=Inverse Fast Fourier Transformation) with or without CP, e.g. DFT-s-OFDM (DFT=discrete Fourier transform). Other waveforms, like non-orthogonal waveforms for multiple access, e.g. filter-bank multicarrier, FBMC, generalized frequency division multiplexing, GFDM, or universal filtered multi carrier, UFMC, may be used. The wireless communication system may operate, e.g., in accordance with the LTE-Advanced pro standard, or the 5G or NR, New Radio, standard, or the NR-U, New Radio Unlicensed, standard.

The wireless network or communication system depicted in FIG. 1 may be a heterogeneous network having distinct overlaid networks, e.g., a network of macro cells with each macro cell including a macro base station, like base stations $gNB_1$ to $gNB_5$, and a network of small cell base stations, not shown in FIG. 1, like femto or pico base stations. In addition to the above described terrestrial wireless network also non-terrestrial wireless communication networks, NTN, exist including spaceborne transceivers, like satellites, and/or airborne transceivers, like unmanned aircraft systems. The non-terrestrial wireless communication network or system may operate in a similar way as the terrestrial system described above with reference to FIG. 1, for example in accordance with the LTE-Advanced Pro standard or the 5G or NR, new radio, standard.

In mobile communication networks, for example in a network like that described above with reference to FIG. 1, like an LTE or 5G/NR network, there may be UEs that communicate directly with each other over one or more sidelink, SL, channels, e.g., using the PC5/PC3 interface or WiFi direct. UEs that communicate directly with each other over the sidelink may include vehicles communicating directly with other vehicles, V2V communication, vehicles communicating with other entities of the wireless communication network, V2X communication, for example roadside units, RSUs, or roadside entities, like traffic lights, traffic signs, or pedestrians. An RSU may have a functionality of a BS or of a UE, depending on the specific network configuration. Other UEs may not be vehicular related UEs and may comprise any of the above-mentioned devices. Such devices may also communicate directly with each other, D2D communication, using the SL channels.

In a wireless communication network, like the one depicted in FIG. 1, it may be desired to locate a UE with a certain accuracy, e.g., determine a position of the UE in a cell. Several positioning approaches are known, like satellite-based positioning approaches, e.g., autonomous and assisted global navigation satellite systems, A-GNSS, such as GPS, mobile radio cellular positioning approaches, e.g., observed time difference of arrival, OTDOA, and enhanced cell ID, E-CID, or combinations thereof.

It is noted that the information in the above section is only for enhancing the understanding of the background of the invention and, therefore, it may contain information that does not form known technology that is already known to a person of ordinary skill in the art.

Starting from the above, there may be a need for improvements or enhancements with regard to transmitting or receiving a beam direction configuration in a wireless communication system or network.

SUMMARY

An embodiment may have an apparatus for transmitting and receiving data in a wireless communication system, wherein the apparatus is a user equipment, wherein the apparatus is configured to receive a message from a further network entity, wherein the apparatus is configured to determine one or more transmit spatial filters and/or one or more receive spatial filters and/or one or more beam directions; wherein the one or more transmit spatial filters and/or the one or more receive spatial filters are identical to at least one initial spatial filter or are derived by the apparatus from the at least one initial spatial filter; wherein the one or more beam directions are identical to at least one initial beam direction or are derived by the apparatus from the at least one initial beam direction; and wherein the apparatus is configured to apply the one or more transmit spatial filters and/or the one or more beam directions on one or more uplink resources; and/or wherein the apparatus is configured to apply the one or more receive spatial filters and/or the one or more beam directions on one or more downlink resources; wherein the message has directional angle information indicating a beam direction for at least one of the one or more beam directions, characterized in that the message has directional angle information indicating in a geographic coordinate system or in a local coordinate system the following information: an azimuth angle and an azimuth angle uncertainty indicating an azimuth angle uncertainty range; and an elevation angle and an elevation angle uncertainty indicating an elevation angle uncertainty range, wherein the apparatus is configured to determine an actual azimuth angle of departure using the azimuth angle and the azimuth angle uncertainty of the directional angle information of the message; and wherein the apparatus is configured to determine an actual zenith angle of departure using the elevation angle and the elevation angle uncertainty of the directional angle information of the message.

According to another embodiment, a method, executed by an apparatus, for transmitting and receiving data in a wireless communication system, wherein the apparatus is a user equipment may have the steps of: receiving, by the apparatus, a message from a further network entity, determining, by the apparatus, one or more transmit spatial filters and/or one or more receive spatial filters and/or one or more beam directions; wherein the one or more transmit spatial filters and/or the one or more receive spatial filters are identical to at least one initial spatial filter or are derived by the apparatus from the at least one initial spatial filter; wherein the one or more beam directions are identical to at least one initial beam direction or are derived by the apparatus from the at least one initial beam direction; and applying, by the apparatus, the one or more transmit spatial filters and/or the one or more beam directions on one or more uplink resources; and/or applying, by the apparatus, the one or more receive spatial filters and/or the one or more beam directions on one or more downlink resources; wherein the message has directional angle information indicating a beam direction for at least one of the one or more beam directions, characterized in that the message has directional angle information indicating in a geographic coordinate system or in a local coordinate system the following information: an azimuth angle and an azimuth angle uncertainty indicating an azimuth angle uncertainty range; and an elevation angle and an elevation angle uncertainty indicating an elevation angle uncertainty range, wherein the method has determining an actual azimuth angle of departure using the azimuth angle and the azimuth angle uncertainty of the directional angle information of the message; and wherein the method has determining an actual zenith angle of departure using the elevation angle and the elevation angle uncertainty of the directional angle information of the message.

Another embodiment may have a non-transitory digital storage medium having stored thereon a computer program for performing a method, executed by an apparatus, for transmitting and receiving data in a wireless communication system, wherein the apparatus is a user equipment, the method having the steps of: receiving, by the apparatus, a message from a further network entity, determining, by the apparatus, one or more transmit spatial filters and/or one or more receive spatial filters and/or one or more beam directions; wherein the one or more transmit spatial filters and/or the one or more receive spatial filters are identical to at least one initial spatial filter or are derived by the apparatus from the at least one initial spatial filter; wherein the one or more beam directions are identical to at least one initial beam direction or are derived by the apparatus from the at least one initial beam direction; and applying, by the apparatus, the one or more transmit spatial filters and/or the one or more beam directions on one or more uplink resources; and/or applying, by the apparatus, the one or more receive spatial filters and/or the one or more beam directions on one or more downlink resources; wherein the message has directional angle information indicating a beam direction for at least one of the one or more beam directions, characterized in that the message has directional angle information indicating in a geographic coordinate system or in a local coordinate system the following information: an azimuth angle and an azimuth angle uncertainty indicating an azimuth angle uncertainty range; and an elevation angle and an elevation angle uncertainty indicating an elevation angle uncertainty range, wherein the method has determining an actual azimuth angle of departure using the azimuth angle and the azimuth angle uncertainty of the directional angle information of the message; and wherein the method has determining an actual zenith angle of departure using the elevation angle and the elevation angle uncertainty of the directional angle information of the message, when said computer program is run by a computer.

An apparatus for transmitting and receiving data in a wireless communication system according to an embodiment is provided. The apparatus is configured to receive a first message and/or a second message from a further network entity. Moreover, the apparatus is configured to determine one or more transmit spatial filters and/or one or more receive spatial filters and/or one or more beam directions; wherein the one or more transmit spatial filters and/or the one or more receive spatial filters are identical to at least one initial spatial filter or are derived by the apparatus from the at least one initial spatial filter. The one or more beam directions are identical to at least one initial beam direction or are derived by the apparatus from the at least one initial beam direction. Furthermore, the apparatus is configured to apply the one or more transmit spatial filters and/or the one or more receive spatial filters and/or the one or more beam directions on one or more downlink resources and/or on one or more uplink resources.

In an embodiment, the apparatus may, e.g., be configured to receive from the further network entity of the wireless network the first message indicating a measurement request or indicating an information request or indicating a positioning activation request. Moreover, the apparatus may, e.g., be configured to receive from the further network entity the second message comprising an indication on the at least one initial spatial filter or on the at least one initial beam direction for a transmission of the one or more downlink resources and/or for a reception of the one or more uplink resources. Furthermore, the apparatus may, e.g., be configured to determine the one or more transmit spatial filters and/or the one or more receive spatial filters and/or one or more beam directions depending on the indication.

In an embodiment, the apparatus may, e.g., be a user equipment.

According to another embodiment, the apparatus may, e.g., be a base station.

In an embodiment, the further network entity may, e.g., implement a location management function.

Moreover, a user equipment for receiving and/or for transmitting data in a wireless communication system according to an embodiment is provided. The user equipment is configured to receive a message from a base station or from a further network entity of the wireless communication system, wherein the message comprises one or more configurations for the reception of one or more downlink transmissions by one or more downlink resources associated with one or more serving or neighboring base stations. Moreover, the user equipment is configured to determine one or more receive spatial filters or one or more beam directions for the one or more downlink resources depending on the message. Furthermore, the user equipment is configured to apply the one or more receive spatial filters or the one or more beam directions on the one or more downlink resources for receiving the one or more downlink transmissions by the one or more downlink resources.

Moreover, a network entity of a wireless communication system for providing transmit or receive spatial filter information according to an embodiment is provided. The network entity is configured to receive information from a first base station and/or a measurement report from a measurement device including measurements of a downlink transmission by a downlink resource transmitted from a second base station. Furthermore, the network entity is configured to determine direction information depending on the information and/or depending on the measurement report. Moreover, the network entity is configured to map the direction information for one or more uplink resources and/or one or more downlink resources. Furthermore, the network entity is configured to provide a message to the second base station comprising an indication of one or more spatial filters or one or more beam directions for one or more downlink transmissions by one or more downlink resources and/or for one or more uplink receptions by one or more uplink resources. And/or, the network entity is configured to provide a message to a user equipment of the wireless communication system, wherein the message comprises one or more configurations indicating the transmit spatial filter information on one or more uplink resources, wherein the message comprises information on one or more spatial filters or one or more beam directions for receiving one or more downlink transmissions by one or more downlink resources.

Furthermore, a network entity for providing transmit or receive spatial filter information of a wireless communication system according to an embodiment is provided. The network entity is configured to receive information from a first base station and/or a measurement report from a measurement device including measurements of a downlink transmission by a downlink resource transmitted from a second base station. Moreover, the network entity is configured to determine direction information depending on the information and/or depending on the measurement report. Furthermore, the network entity is configured to map the direction information for one or more uplink resources and/or one or more downlink resources. Moreover, the network entity is configured to provide a message to the second base station comprising an indication of one or more spatial filters or one or more beam directions for one or more downlink transmissions by one or more downlink resources and/or for one or more uplink receptions by one or more uplink resources; and/or the network entity is configured to provide a message to a user equipment of the wireless communication system, wherein the message comprises one or more configurations indicating transmit spatial filter information on one or more uplink resources, wherein the message comprises information on one or more spatial filters or one or more beam directions for receiving one or more downlink transmissions by one or more downlink resources.

According to an embodiment, the network entity may, e.g., implement a location management function.

Moreover, a wireless communication system according to an embodiment is provided. The wireless communication system comprises an for transmitting and receiving data as described above and further comprises the network entity or the further network entity described above.

In an embodiment, the wireless communication system may, e.g., comprise the user equipment as described above.

Furthermore, a method for transmitting and for receiving data in a wireless communication system according to an embodiment is provided. The method comprises receiving a first message and/or a second message. Moreover, the method comprises:

Determining one or more transmit spatial filters and/or one or more receive spatial filters and/or one or more beam directions; wherein the one or more transmit spatial filters and/or the one or more receive spatial filters are identical to at least one initial spatial filter or are derived by the apparatus from the at least one initial spatial filter; wherein the one or more beam directions are identical to at least one initial beam direction or are derived by the apparatus from the at least one initial beam direction. And:

Applying the one or more transmit spatial filters and/or the one or more receive spatial filters and/or the one or more beam directions on one or more downlink resources and/or on one or more uplink resources.

Moreover, a method for receiving and/or for transmitting data in a wireless communication system according to an embodiment is provided. The method comprises:

Receiving by a user equipment a message from a base station or from a further network entity of the wireless communication system, wherein the message comprises one or more configurations for the reception of one or more downlink transmissions by one or more downlink resources associated with one or more serving or neighboring base stations.

Determining by the user equipment one or more receive spatial filters or one or more beam directions for the one or more downlink resources depending on the message. And:

Applying by the user equipment the one or more receive spatial filters or the one or more beam directions on the one or more downlink resources for receiving the one or more downlink transmissions by the one or more downlink resources.

Moreover, a method for providing transmit or receive spatial filter information according to an embodiment is provided. The method comprises:

Receiving information from a first base station and/or a measurement report from a second base station including measurements of an uplink transmission by an uplink resource transmitted from one or more user equipments.

Determining direction information depending on the information and/or depending on the measurement report.

Mapping the direction information for one or more uplink resources and/or one or more downlink resources.

Providing a message to the second base station comprising an indication of one or more spatial filters or one or more beam directions for one or more downlink transmissions by one or more downlink resources and/or for one or more uplink receptions by one or more uplink resources. And/or:

Providing a message to a user equipment of the wireless communication system, wherein the message comprises one or more configurations indicating the transmit spatial filter information on one or more uplink resources, wherein the message comprises information on one or more spatial filters or one or more beam directions for receiving one or more downlink transmissions by one or more downlink resources.

Furthermore, a method for providing transmit or receive spatial filter information according to an embodiment is provided. The method comprises:

Receiving by a network entity information from a first base station and/or a measurement report from a measurement device including measurements of a downlink transmission by a downlink resource transmitted from a second base station.

Determining by the network entity direction information depending on the information and/or depending on the measurement report.

Mapping by the network entity the direction information for one or more uplink resources and/or one or more downlink resources;

Providing by the network entity a message to the second base station comprising an indication of one or more spatial filters or one or more beam directions for one or more downlink transmissions by one or more downlink resources and/or for one or more uplink receptions by one or more uplink resources. And/or:

Providing by the network entity message to a user equipment of the wireless communication system, wherein the message comprises one or more configurations indicating transmit spatial filter information on one or more uplink resources, wherein the message comprises information on one or more spatial filters or one or more beam directions for receiving one or more downlink transmissions by one or more downlink resources.

Moreover, non-transitory computer program products according to embodiments are provided which each comprise a computer readable media storing instructions which, when executed on a computer, perform one of the above-described methods.

BRIEF DESCRIPTION OF THE DRAWINGS

Embodiment of the present invention will be detailed subsequently referring to the appended drawings, in which:

FIG. 7 illustrates a flowchart of a method to enable a beam direction configuration for BS-specific DL-RS(s);

FIG. 8 illustrates an example of a computer system on which units or modules as well as the steps of the methods described in accordance with the inventive approach may execute;

DETAILED DESCRIPTION OF THE INVENTION

Embodiments of the present invention are now described in more detail with reference to the accompanying drawings, in which the same or similar elements have the same reference signs assigned.

For DL-PRS (Downlink Positioning Reference Signal) the TRP (Transmission Reception Point) may entail configuring multiple PRS (Positioning Reference Signal) resources to provide coverage within a certain area. This becomes relevant for the second when the beam guidance information are used to enable a SP-PRS (semi-persistent Positioning Reference Signal) or an A-PRS (aperiodic Positioning Reference Signal) procedure.

For aperiodic and/or semi-persistent (AP,SP) PRS M-TRP (multi-TRP) cannot be enabled based on the Rel-16 procedure. Also for UL-SRS (Uplink Sounding Reference Signal) the TRP may miss certain SRS (Sounding Reference Signal) transmissions since the start measurement time is not known at the non-serving cells.

The TRP doesn't have information or measurement reports to select a direction for transmitting or receiving a reference signal.

In DL (Downlink): Without such kind of information the TRP cannot perform On-demand or UE specific PRS (i.e. not a preconfigured multi-TRP beam configuration).

In UL (Uplink): The TRP additional complexity is introduced if the TRP doesn't have an direction indication on the UL reference signal direction (especially in FR2; Frequency range 2).

The LMF (Location Management Function) provides the TRP with information on the direction the TRP is expected to receive an UL-SRS or transmit a DL-PRS. The focus is on the signaling and procedure including type of information provided. The provided information reduces the complexity and latency for TRPs especially that not directly communicating (i.e. no UE RSRP reports available; RSRP=Reference Signal Received Power) with the target UE whose position is to be determined.

Figures 1A, 1B:
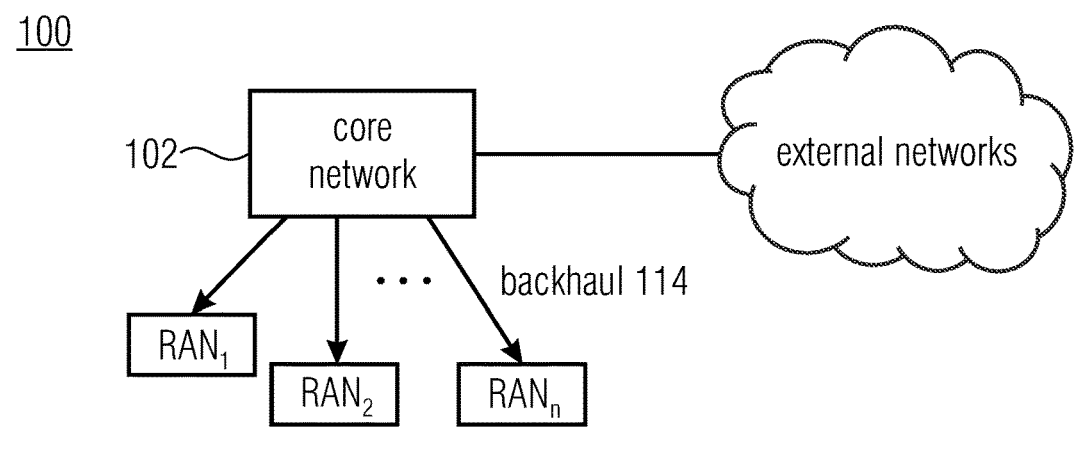
FIG. 1(a) illustrates a core network and one or more radio access networks $RAN_1$, $RAN_2$, . . . $RAN_N$ (RAN=Radio Access Network)
FIG. 1(b) illustrates a schematic representation of an example of a radio access network RAND that may include one or more base stations
Figure 2:
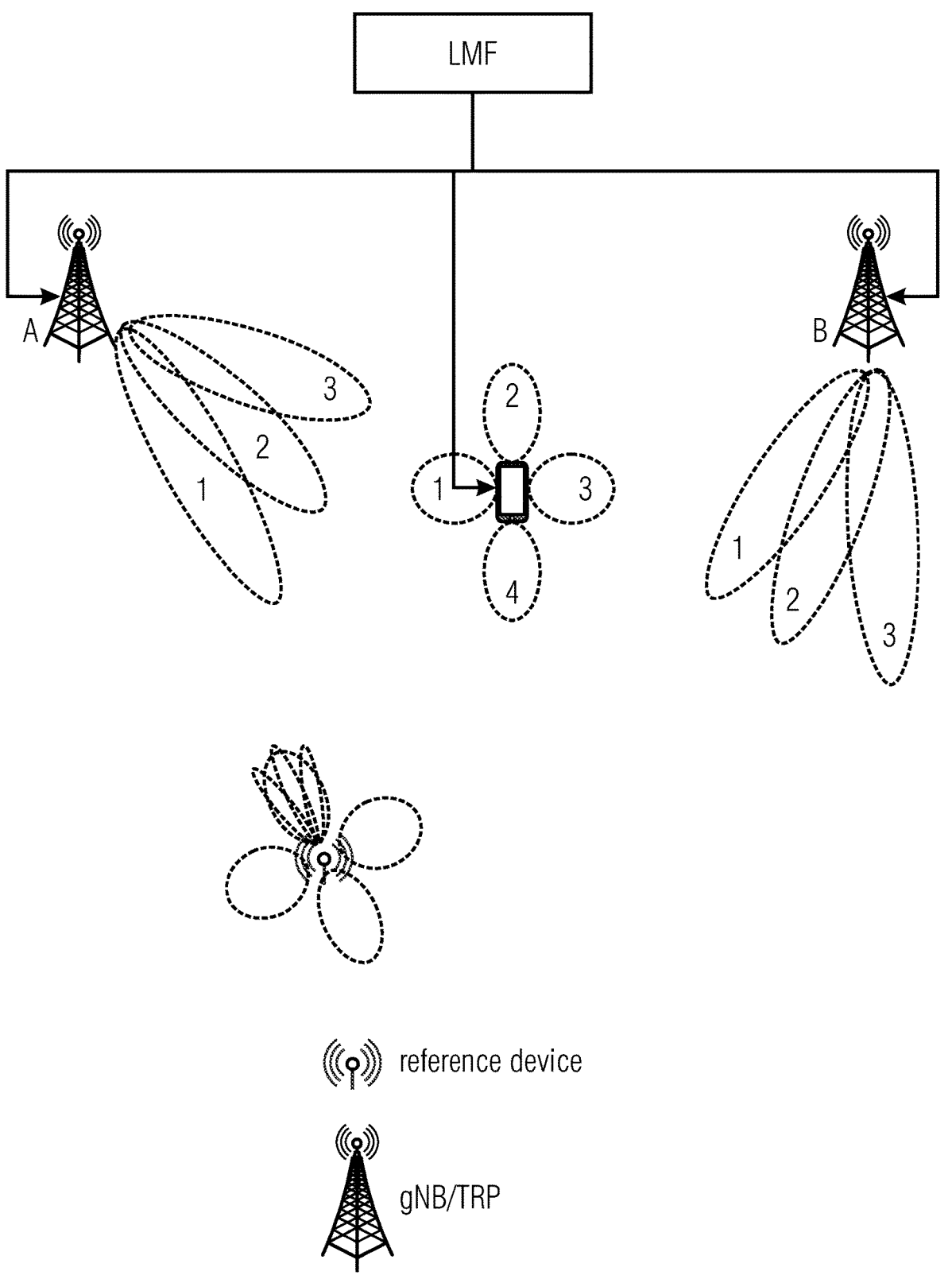
FIG. 2 illustrates a plurality of communication resources.

FIG. 2 illustrates that in downlink, the TRPs receive information on the direction for one or more DL-PRS resources, and that in uplink, the TRPs are indicated on the Rx-beams to received one or more UL-SRS signal from the UE.

Figure 3:
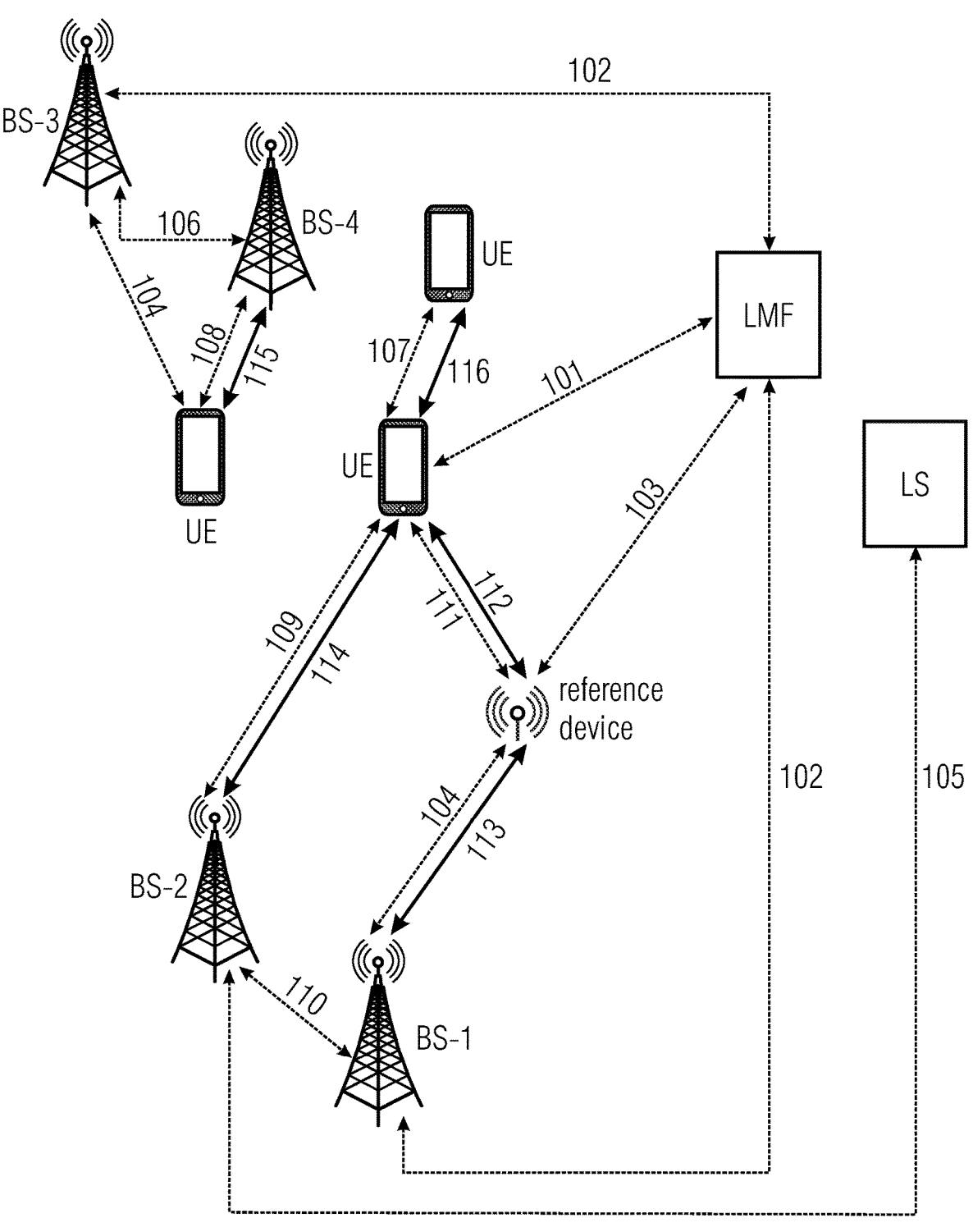
FIG. 3 illustrates an example of a positioning wireless network architecture.

FIG. 3 illustrates wireless positioning communication system, more particularly, an example of a positioning wireless network architecture. The wireless communication system illustrated in Fig may be any single-tone or multi-carrier system using frequency-division multiplexing, like orthogonal frequency-division multiplexing, OFDM, or orthogonal frequency-division multiple access, OFDMA, or any other IFFT-based signal with or without CP, e.g. DFT-s-OFDM. Other waveforms, like non-orthogonal waveforms for multiple access, e.g. filter-bank multicarrier, FBMC, generalized frequency division multiplexing, GFDM, or universal filtered multi carrier, UFMC, may be used. The wireless communication system may operate, e.g., in accordance with the LTE-Advanced pro standard, or the 5G or NR, New Radio, standard, or the NR-U, New Radio Unlicensed, standard.

The wireless network or communication system depicted in Fig may be a heterogeneous network having distinct overlaid networks, e.g., a network of macro cells with each macro cell including a macro base station, like base stations BS1 to BS4, and a network of small cell base stations, not shown in Fig, like femto or pico base stations. In addition to the above described terrestrial wireless network also non-terrestrial wireless communication networks, NTN, exist including spaceborne transceivers, like satellites, and/or airborne transceivers, like unmanned aircraft systems. The non-terrestrial wireless communication network or system may operate in a similar way as the terrestrial system described above with reference to Fig, for example in accordance with the LTE-Advanced Pro standard or the 5G or NR, new radio, standard.

The base station can wirelessly communicate and exchange messages with one or more UEs (104, 108, 109) and/or one or more reference devices (104). The Base stations can directly communicate and exchange information with other Base stations (106 110), the other base station may be from the technology, and/or same or different generation or even a different technology. The target UEs and/or reference devices may perform wireless signaling for the purpose of positioning or synchronization (112 to 116). The BS may include the distributed units connected via the F1 interface (106) to the respective central unit or BS, in turn or over a non-standard interface. Two central BS(s) may also be connected via the XN/X2 interface(s) or over a non-standard interface.

In mobile communication networks, for example in a network like that described above with reference to Fig, like an LTE or 5G/NR network, there may be UEs that communicate directly with each other over one or more sidelink, SL, channels, e.g., using the PC5/PC3 interface or WiFi direct (107). UEs that communicate directly with each other over the sidelink may include vehicles communicating directly with other vehicles, V2V (vehicle(s) to vehicle(s)) communication, vehicles communicating with other entities of the wireless communication network, V2X (Vehicle to Everything) communication, for example roadside units, RSUs, or roadside entities, like traffic lights, traffic signs, or pedestrians. An RSU may have a functionality of a BS or of a UE, depending on the specific network configuration. Other UEs may not be vehicular related UEs and may comprise any of the above-mentioned devices. Such devices may also communicate directly with each other, D2D communication, using the SL channels.

The network entitie(s) which may be involved in computing the position of a UE, and the interfaces between the UE (101, 103) and the other network RAN entities or the similar (102, 105). The network entity may be part of the core network includes the location management function, LMF, and the Access and Mobility Management Function, AMF, which communicate using the Network Layer Signaling protocol, NLs. The network entity may be part of the core network includes the location server communicating over a control or a user plane interface with the other entities and devices of the network.

In a wireless communication network, like the one depicted in Fig, it may be desired to locate a UE with a certain accuracy, e.g., determine a position of the UE in a cell. Several positioning approaches are known, like satellite-based positioning approaches, e.g., autonomous and assisted global navigation satellite systems, A-GNSS, such as GPS, mobile radio cellular positioning approaches, e.g., observed time difference of arrival, OTDOA, and enhanced cell ID, E-CID, or combinations thereof.

It is noted that the information in the above section is only for enhancing the understanding of the background of the invention and, therefore, it may contain information that does not form known technology that is already known to a person of ordinary skill in the art.

Figure 9:
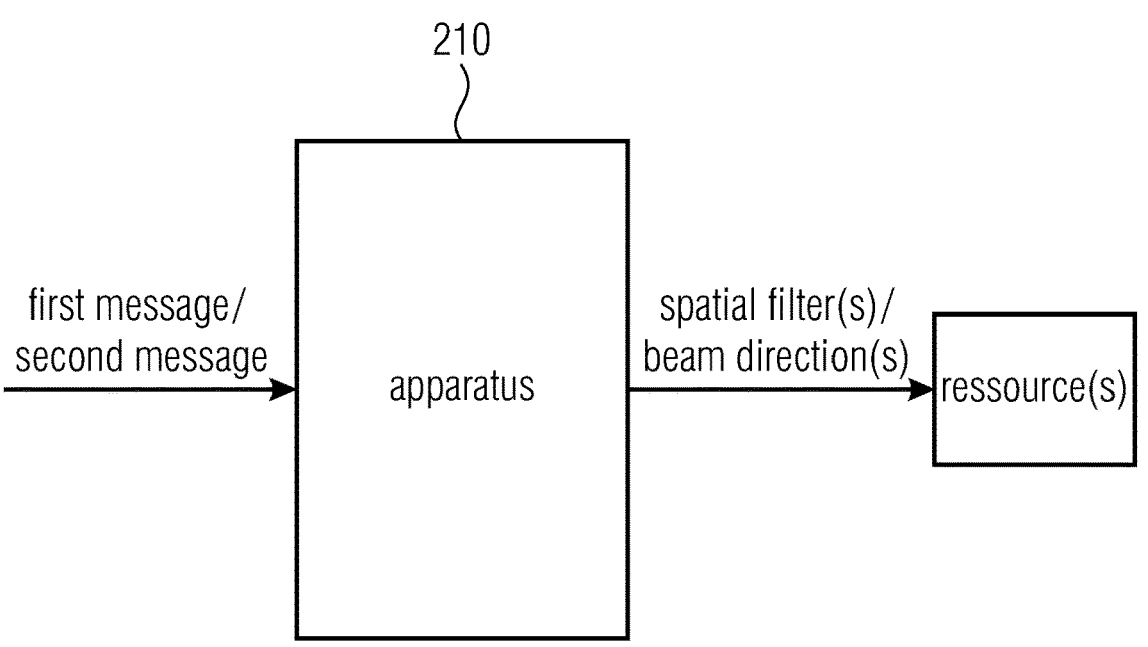
FIG. 9 illustrates an apparatus for transmitting and receiving data in a wireless communication system according to an embodiment.

FIG. 9 illustrates an apparatus 210 for transmitting and receiving data in a wireless communication system according to an embodiment.

The apparatus 210 is configured to receive a first message and/or a second message from a further network entity.

Moreover, the apparatus 210 is configured to determine one or more transmit spatial filters and/or one or more receive spatial filters and/or one or more beam directions; wherein the one or more transmit spatial filters and/or the one or more receive spatial filters are identical to at least one initial spatial filter or are derived by the apparatus 210 from the at least one initial spatial filter. The one or more beam directions are identical to at least one initial beam direction or are derived by the apparatus 210 from the at least one initial beam direction.

Furthermore, the apparatus 210 is configured to apply the one or more transmit spatial filters and/or the one or more receive spatial filters and/or the one or more beam directions on one or more downlink resources and/or on one or more uplink resources.

According to another embodiment, the apparatus 210 may, e.g., be a base station.

According to an embodiment, support for beam indication of uplink measurements may, e.g., be provided.

In an embodiment, the apparatus may, e.g., be a base station (gNB), and may, e.g., provide a gNB indication for uplink SRS for uplink positioning assistance data.

In an embodiment, the apparatus 210 may, e.g., be a user equipment (UE). Or, in an embodiment, the apparatus may 210, e.g., implement a location management function (LMF).

E.g., according to an embodiment, an indication for DL-PRS for On demand PRS assistance data may, e.g., be provided. E.g., the indication may, e.g., be transmitted from an LMF to a gNB or may, e.g., be transmitted from a UE to an LMF which may, e.g., forward the indication to a gNB.

For example, according to an embodiment, a downlink PRS parameter (e.g., DL PRS QCL information) may, e.g., be employed for a UE-initiated and LMF-initiated on-demand downlink PRS requests (QCL: Quasi Co Location).

In an embodiment, the apparatus 210 may, e.g., be a user equipment (UE), and the UE may, e.g., receive an indication for an uplink SRS for downlink positioning assistance data.

According to an embodiment, the apparatus 210 (e.g., a UE) may, e.g., receive directional information (e.g., for AoD) from an LMF, derived based on a coarse position estimate for DL AoD assistance. This may, e.g., help to reduce the search space at the apparatus 210 (e.g., at the UE).

E.g., for the DL-AoD of two UEs (e.g., UE-A and UE-B), and with regard to the support of AOD measurements with an expected uncertainty window, an indication of an expected angle value and uncertainty (of the expected azimuth and zenith angle value) range(s) may, e.g., be signaled by the LMF to the apparatus 210 (e.g., the UE), and/or a type of an expected angle and uncertainty may, e.g., be requested by the apparatus 210 (e.g., the UE).

For example, an indication of an expected DL-AoD/ZoD value and uncertainty (of the expected DL-AoD/ZoD value) range(s) may, e.g., be signaled by the LMF to the apparatus 210 (e.g., the UE).

And/or, for example, an indication of an expected DL-AoA/ZoA value and uncertainty (of the expected DL-AoA/ZoA value) range(s) may, e.g., be signaled by the LMF to the apparatus 210 (e.g., the UE).

According to an embodiment, the apparatus 210 may, e.g., be configured to receive from the further network entity of the wireless network the first message indicating a measurement request or indicating an information request or indicating a positioning activation request. The apparatus 210 may, e.g., be configured to receive from the further network entity the second message comprising an indication on the at least one initial spatial filter or on the at least one initial beam direction for a transmission of the one or more downlink resources and/or for a reception of the one or more uplink resources. Moreover, the apparatus 210 may, e.g., be configured to determine the one or more transmit spatial filters and/or the one or more receive spatial filters and/or one or more beam directions depending on the indication.

In an embodiment, the indication may, e.g., comprise one or more identifiers of the one or more uplink resources and/or of one or more uplink resource sets comprising the one or more uplink resources, wherein the one or more identifiers indicate the at least one initial spatial filter or the at least one initial beam direction for the transmission of one or more downlink resources. And/or, the indication may, e.g., comprise one or more identifiers of one or more downlink resources and/or of one or more downlink resource sets comprising the one or more downlink resources, wherein the one or more identifiers indicate the at least one initial spatial filter or the at least one initial beam direction for the reception of one or more uplink resources.

According to an embodiment, the indication may, e.g., comprise one or more further identifiers of the one or more uplink resources and/or of the one or more uplink resource sets to indicate at least one further spatial filter or at least one further beam direction for the reception of another one or more uplink resources. And/or, the indication may, e.g., comprise one or more further identifiers of the one or more downlink resources and/or of the one or more downlink resource sets to indicate at least one further spatial filter or at least one further beam direction for the transmission of another one or more downlink resources.

In an embodiment, the indication may, e.g., comprise one or more identifiers of the one or more uplink resources, wherein each of the one or more identifiers may, e.g., be associated with a single uplink resource of the one or more uplink resources or with a single uplink resource set of the one or more uplink resource sets.

According to an embodiment, the indication may, e.g., comprise one or more identifiers of the one or more downlink resources, wherein each of the one or more identifiers may, e.g., be associated with a single downlink resource of the one or more downlink resources or with a single downlink resource set of the one or more downlink resource sets.

In an embodiment, the one or more identifiers may, e.g., be associated with the one or more uplink resources. The apparatus 210 may, e.g., be configured to determine for each uplink resource of the one or more uplink resources or for each uplink resource set of the one or more uplink resource sets, depending on a spatial filter settings or a beam direction setting, the one or more transmit spatial filters or the one or more beam directions for the one or more downlink resources.

According to an embodiment, the apparatus 210 may, e.g., be configured to receive a (measurement) request message from the further network entity to perform one or more uplink resource measurements of the one or more uplink resources. The (measurement) request message may, e.g., comprise an indication on the at least one initial spatial filter or an indication on the at least one initial beam directions for the one or more uplink resource measurements and/or an indication of the type of the measurement. The apparatus 210 may, e.g., be configured to conduct the uplink resource measurements depending on the indication.

For example, an additional assistance signaling from LMF to gNB/TRP may, e.g., be supported to facilitate UL measurements of UL-AOA, wherein the additional assistance signaling may, e.g., be an indication of an expected AoA/ZoA value and uncertainty (of the expected AoA/ZoA value) range(s) (AoA=azimuth angle of arrival; ZoA=zenith angle of arrival).

In an embodiment, the (measurement) request message may, e.g., be the first message or may, e.g., be the second message, or may, e.g., be another third message.

In an embodiment, the apparatus 210 may, e.g., be configured to provide information on the one or more transmit spatial filters or on the one or more receive spatial filters or on the one or more beam directions to the further network entity.

According to an embodiment, the apparatus 210 may, e.g., be configured to provide the information on the one or more transmit spatial filters or on the one or more receive spatial filter or on the one or more beam directions to the further network entity in response to the first message indicating the measurement request.

In an embodiment, the apparatus 210 may, e.g., be configured to receive the first message indicating the measurement request which requests the apparatus 210 to provide a time information for the reception of the one or more uplink resources over one or more measurement instances in one or more measurement reports. The apparatus 210 may, e.g., be configured to provide for the one or more measurements instances associated with the one or more measurement reports said time information for said one or more uplink resources.

According to an embodiment, the apparatus 210 may, e.g., be configured to provide information on a positioning reference signal configuration to the further network entity, wherein said information indicates a direction of said positioning reference signal.

In an embodiment, the apparatus 210 may, e.g., be configured to receive a message from the further network entity comprising an information request on one or more downlink resource configurations. The apparatus 210 may, e.g., be configured to provide the further network entity information on the one or more downlink resource configurations, said information comprising one or more identifiers for on one or more downlink resources, wherein the one or more downlink resources belong to one or more resource set identifiers corresponding to an apparatus 210 identifier at a given frequency layer.

According to an embodiment, the apparatus 210 may, e.g., be configured to receive a request from the further network entity to modify a direction of the one or more transmit spatial filters associated with the one or more downlink resources.

In an embodiment, the apparatus 210 may, e.g., be configured to receive a request from the further network entity to modify a direction of the one or more receive spatial filters corresponding to the one or more uplink resources.

According to an embodiment, the first message from the further network entity may, e.g., comprise a positioning activation for an Uplink Sounding Reference Signal transmission.

In an embodiment, the first message from the further network entity may, e.g., comprise an activation or triggering of a downlink resource transmission. The apparatus 210 may, e.g., be configured to provide the further network entity an activation response or an activation failure on the first message with the activation or with the triggering. Moreover, the apparatus 210 may, e.g., be configured to receive, after the activation response, the second message comprising a configuration that comprises an indication of the at least one initial spatial filter or of the one or more beam directions for the transmission of at least one downlink resource and/or one or more identifiers of the one or more downlink resources, being activated or triggered.

For example, for an LMF-initiated request of on-demand DL PRS, the a group of on-demand DL PRS parameters is defined and signaled, e.g., a per resource set per positioning frequency layer per FR.

For example, a parameter may, e.g., be supported for UE-initiated and LMF initiated on-demand DL PRS request, for example, an ON/OFF indicator (for LMF initiated request only)

According to an embodiment, the second message may, e.g., comprise directional angle information or a geographical area indication indicating a beam direction for at least one of the one or more beam directions.

In an embodiment, the second message may, e.g., comprise an indication comprising spatial filter information which may, e.g., comprise a downlink resource indication and/or one or more identifiers of the one or more downlink resources or of the one or more downlink resource sets corresponding to the one or more downlink resources transmitted by the apparatus 210. And/or, the spatial filter information may, e.g., comprise an uplink resource indication and/or one or more identifiers of the one or more uplink resources or of the one or more uplink resource sets corresponding to the one or more uplink resources received by the apparatus 210.

According to an embodiment, the second message may, e.g., comprise an indication or information for the transmission of the one or more downlink resources, wherein the indication or the information may, e.g., comprise an identifier of one or more reference downlink resources. The apparatus 210 may, e.g., be configured to use the information or the indication to determine the one or more transmit spatial filters for the downlink resources having similar direction characteristics as the reference downlink resources.

In an embodiment, the second message may, e.g., comprise an indication or information for the transmission of the one or more downlink resources, wherein the indication or information may, e.g., comprise an identifier for one or more reference uplink resources. The apparatus 210 may, e.g., be configured to use the information or the indication to determine the one or more transmit spatial filters for the downlink resources having similar direction characteristics as the one or more receive spatial filters used for the reception of the one or more reference uplink resources.

According to an embodiment, the second message may, e.g., comprise an indication or information for the reception of the one or more uplink resources, wherein the information may, e.g., comprise an identifier for one or more reference uplink resources. The apparatus 210 may, e.g., be configured to use the information or the indication to select the one or more receive spatial filters for a reception of the uplink resources having similar direction characteristics as a spatial filter used for the reception of the one or more reference uplink resources.

In an embodiment, the second message may, e.g., comprise an indication or information for the reception of the one or more uplink resources, wherein the information may, e.g., comprise an identifier for one or more reference downlink resources. The apparatus 210 may, e.g., be configured to use the information or the indication to select the one or more receive spatial filters for a reception of the uplink resources having similar direction characteristics as a spatial filter used for the transmission of the one or more reference downlink resources.

According to an embodiment, the second message may, e.g., comprise directional angle information indicating in a geographic coordinate system or in a local coordinate system comprising one or more of the following information:
an azimuth angle,
an elevation angle,
an azimuth angle uncertainty,
an elevation angle uncertainty.

An uncertainty range for an expected UL AoA/ZoA may, for example, be defined such that an expected azimuth angle of arrival may, e.g., be in the range $$[\varphi AOA - \Delta\varphi AOA/2, \varphi AOA + \Delta\varphi AOA/2]$$

φAOA may, e.g., indicate the expected azimuth angle of arrival,
ΔφAOA may, e.g., indicate an uncertainty range for expected azimuth angle of arrival
An expected zenith angle of arrival may, e.g., be in the range $$[\theta AOA - \Delta\theta AOA/2, \theta AOA + \Delta\theta AOA/2]$$

θAOA may, e.g., indicate an expected zenith angle of arrival,
ΔθAOA may, e.g., indicate an uncertainty range for expected zenith angle of arrival
For example, a granularity of 0.1 degrees may, e.g., be applied for the expected AoA (φAOA), expected ZoA (θZOA) and the corresponding uncertainty values.

In an embodiment, the second message may, e.g., comprise information indicating in a map projection area in a geographic Coordinate System or in a Local Coordinate System or a relative geodetic location comprising one or more of the following information:
X,Y,Z unit values,
an X value, a Y value,
a Z value,
an area uncertainty or confidence,
an area uncertainty or confidence type,
or one or more of the following location information:
one or more degrees of latitude,
one or more degrees of longitude,
an altitude,
a delta latitude,
a delta longitude,
a delta height,
an uncertainty or confidence.

E.g., both GCS (Geographic Coordinate System) and LCS (Leographic Coordinate System) may, e.g., be supported for UL AoA/ZoA assistance information indication.

For example, existing signaling may, e.g., be used for obtaining LCS to GCS translation information.

According to an embodiment, the first message may, e.g., comprise an information request requesting information on one or more uplink resource configurations configured by the apparatus 210. The apparatus 210 may, e.g., be configured to provide information on one or more uplink resources and/or on the one or more uplink resource sets comprising the one or more uplink resources.

In an embodiment, the second message may, e.g., comprise an indication or information of one or more identifiers of the one or more uplink resources or the one or more uplink resources and one or more identifiers of the one or more downlink resources. The apparatus 210 may, e.g., be configured to derive the one or more transmit spatial filters or the one or more receive spatial filters or the one or more beam directions, to be used for the transmission of the one or more downlink resources, from the one or more receive spatial filters or the one or more beam directions used for the reception of the one or more uplink resources or of the one or more uplink resource sets.

According to an embodiment, the apparatus 210 may, e.g., be configured to provide an indication on the one or more transmit spatial filters or on the one or more receive spatial filters or on the one or more beam directions to a user equipment.

In an embodiment, the apparatus 210 may, e.g., be configured to provide to the indication on the one or more transmit spatial filters or on the one or more receive spatial filters or on the one or more beam directions via a physical layer or via a higher layer.

According to an embodiment, the apparatus 210 may, e.g., be configured to provide the indication on the one or more transmit spatial filters or on the one or more receive spatial filters or on the one or more beam directions using a Transmission Configuration Indicator state reference.

In an embodiment, the apparatus 210 may, e.g., be configured to provide the indication by providing an NR Positioning Protocol A indication downlink resource information.

According to an embodiment, the apparatus 210 may, e.g., be configured to receive a further information message, preceding or following the second message, wherein the further information message indicates whether the one or more uplink resources or one or more uplink resource sets and/or the one or more downlink resource or one or more downlink resource sets are originating from and/or targeting to a reference device.

In an embodiment, the further information message may, e.g., comprise one or more of the following parameters:

one or more identifiers of the one or more uplink resources and/or the one or more uplink resource sets associated with a reference device, one or more identifiers of the one or more downlink resources and/or the one or more downlink resource sets associated with the reference device, an indication on the reference device type, position information of the reference device, directional information of the reference device.

According to an embodiment, the apparatus 210 may, e.g., be configured to use the further information message to estimate a Line-of-Sight or Non-Line-of-Sight channel state between the apparatus 210 and the reference device.

In an embodiment, the apparatus 210 may, e.g., be configured to provide in response to a measurement request a measurement report including an indication on the Line-of-Sight or Non-Line-of-Sight channel state for the one or more uplink resources originating from the reference device, or may, e.g., be configured to use information of the reference device to derive a Line-of-Sight or Non-Line-of-Sight indication for measurements on one or more UL-RS originating from a user equipment.

According to an embodiment, in response to the second message, the apparatus 210 may, e.g., be configured to provide to the further network entity an indication on applying the one or more transmit spatial filters and/or the one or more receive spatial filters and/or the one or more beam directions.

In an embodiment, the indication on applying the one or more transmit spatial filters and/or the one or more receive spatial filters and/or the one or more beam directions may, e.g., comprise one or more identifiers of the one or more uplink resources and/or the one or more downlink resources, or a success indication on applying a configuration, or an information on an applied beam direction at the apparatus 210 for transmission and/or reception.

According to an embodiment, the apparatus 210 may, e.g., be configured to provide to the network an indication on an updated selection of the one or more transmit spatial filters and/or the one or more receive spatial filters or the one or more beam directions selected by the apparatus 210.

In an embodiment, the second message may, e.g., comprise validity information on one or more identifiers of the one or more uplink resources and/or on the one or more uplink resource sets, and/or information on one or more identifiers of one or more downlink resources and/or one or more downlink resource sets to indicate the at least one initial spatial filter or the at least one initial beam directions for the reception of one or more uplink resources.

According to an embodiment, the validity information may, e.g., comprise an indication on a time when the configuration is valid, and/or an indication on one or more time windows during which the configuration is applicable.

In an embodiment, the validity information may, e.g., comprise the indication on one or more time windows during which the configuration is applicable, wherein at least one of the one or more time windows may, e.g., comprise an indication on one or more occasions where the configuration is to be applied on an aperiodic or a semi-persistent or a periodic uplink resource reception and/or on a downlink resource transmission.

According to an embodiment, the apparatus 210 may, e.g., be configured to provide information on the one or more downlink resources to the further network entity. The apparatus 210 may, e.g., be configured to receive configuration information for the one or more downlink resources. Moreover, the apparatus 210 may, e.g., be configured to respond to the further network entity in case of a successful operation by confirming the successful operation or in case of an unsuccessful operation by signaling a failure message.

In an embodiment, the apparatus 210 may, e.g., be configured to provide information on a set of one or more configurable downlink resources. The apparatus 210 may, e.g., be configured to receive configuration information for the one or more downlink resources of the set of one or more configurable downlink resources. Moreover, the apparatus 210 may, e.g., be configured to respond to the further network entity in case of a successful operation by confirming the successful operation or in case of an unsuccessful operation by signaling a failure message.

According to an embodiment, the apparatus 210 may, e.g., be configured to receive a Positioning Reference Signal utilization characteristics from the further network entity. The apparatus 210 may, e.g., be configured to provide the information on the configuration of one or more downlink resources, being configured according to the Positioning Reference Signal utilization characteristics to the further network entity.

In an embodiment, the apparatus 210 may, e.g., be configured to receive a configuration message indicating a direction of the one or more downlink resources at the apparatus 210, wherein the configuration message may, e.g., comprise at least one indication which corresponds to an identifier of a downlink resource provided by the apparatus 210 to the further network entity in a previous message.

According to an embodiment, the apparatus 210 may, e.g., be configured to receive a request to reconfigure one or more downlink resources depending on a previously received configuration message or depending on a simultaneous configuration and configuration request. Moreover, the apparatus 210 may, e.g., be configured to respond to the further network entity in case of a successful operation by confirming the configuration request or in case of an unsuccessful operation by signaling a failure message.

In an embodiment, n the apparatus 210 may, e.g., be configured to receive a request to activate the one or more downlink resources depending on a previously received configuration message or depending on a simultaneous configuration and configuration request. The apparatus 210 may, e.g., be configured to respond to the further network entity in case of a successful operation by confirming the configuration request or in case of an unsuccessful operation by signaling a failure message.

According to an embodiment, the apparatus 210 may, e.g., be configured to receive from the further network entity a request in which to provide information on the one or more downlink resources configured at the apparatus 210.

In an embodiment, the apparatus 210 may, e.g., be configured to receive a configuration from the further network entity. Moreover, the apparatus 210 may, e.g., be configured to apply spatial information and/or beam direction information according to the configuration on the one or more downlink resources associated with the characteristics indicated in the configuration from the further network entity.

In an embodiment, the further network entity may, e.g., implement a location management function.

Figure 10:
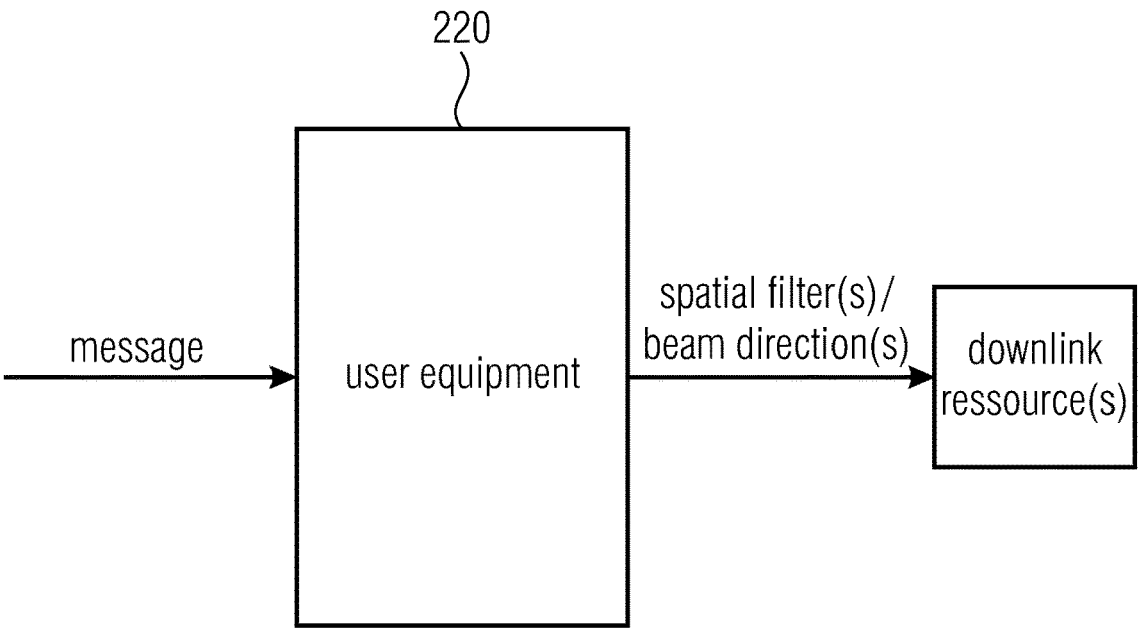
FIG. 10 illustrates a user equipment for receiving and/or for transmitting data in a wireless communication system according to an embodiment.

FIG. 10 illustrates a user equipment 220 for receiving and/or for transmitting data in a wireless communication system according to an embodiment.

The user equipment 220 is configured to receive a message from a base station or from a further network entity of the wireless communication system, wherein the message comprises one or more configurations for the reception of one or more downlink transmissions by one or more downlink resources associated with one or more serving or neighboring base stations.

Moreover, the user equipment 220 is configured to determine one or more receive spatial filters or one or more beam directions for the one or more downlink resources depending on the message, and Furthermore, the user equipment 220 is configured to apply the one or more receive spatial filters or the one or more beam directions on the one or more downlink resources for receiving the one or more downlink transmissions by the one or more downlink resources.

In an embodiment, a UE may, e.g., receive an indication for an uplink SRS for downlink positioning assistance data.

According to an embodiment, the UE may, e.g., receive directional information (e.g., for AoD) from an LMF, derived based on a coarse position estimate for DL AoD assistance. This may, e.g., help to reduce the search space at the UE.

E.g., for the DL-AoD of two UEs (e.g., UE-A and UE-B), and with regard to the support of AOD measurements with an expected uncertainty window, an indication of an expected angle value and uncertainty (of the expected azimuth and zenith angle value) range(s) may, e.g., be signaled by the LMF to the UE, and/or a type of an expected angle and uncertainty may, e.g., be requested by the UE.

For example, an indication of an expected DL-AoD/ZoD value and uncertainty (of the expected DL-AoD/ZoD value) range(s) may, e.g., be signaled by the LMF to the UE.

And/or, for example, an indication of an expected DL-AoA/ZoA value and uncertainty (of the expected DL-AoA/ZoA value) range(s) may, e.g., be signaled by the LMF to the UE.

According to an embodiment, the user equipment 220 may, e.g., be configured to receive from the network entity an indication comprising transmit spatial filter information for one or more uplink resources. The user equipment 220 may, e.g., be configured to determine the one or more receive spatial filters or the one or more beam directions for the one or more downlink resources using said transmit spatial filter information for one or more uplink resources.

In an embodiment, the user equipment 220 may, e.g., be configured to receive, from the base station or from the further network entity, information to perform a measurement on the one or more downlink resources. Moreover, the user equipment 220 may, e.g., be configured to perform the measurement on the one or more downlink resources depending on the information to perform the measurement.

For example, for a UE-assisted DL-AOD positioning concept, to enhance the signaling to the UE for the purpose of PRS resource(s) reporting, the LMF may, e.g., indicate in the assistance data (AD) depending on a UE capability, for each PRS resource, for example, the boresight direction information.

According to an embodiment, the user equipment 220 may, e.g., be configured to receive, from the base station or from the further network entity, a configuration for a sidelink resource transmission by a sidelink resource. The user equipment 220 may, e.g., be configured to apply the configuration on the sidelink resource.

In an embodiment, the user equipment 220 may, e.g., be configured to receive, from the base station or from the further network entity, information to perform a measurement on the sidelink resource. The user equipment 220 may, e.g., be configured to perform the measurement on the sidelink resource depending on the information to perform the measurement.

According to an embodiment, the user equipment 220 may, e.g., be configured to receive a message from the base station or from the further network entity, comprising one or more configurations for the reception of the one or more downlink transmissions by the one or more downlink resources from one or more serving or neighboring base stations.

In an embodiment, the user equipment 220 may, e.g., be configured to receive, from the base station or from the further network entity, an indication including transmit spatial filter information on one or more sidelinks. Moreover, the user equipment 220 may, e.g., be configured to determine the one or more receive spatial filters or the one or more beam directions for receiving the one or more downlink transmissions by the one or more downlink resources using the indication.

According to an embodiment, the user equipment 220 may, e.g., be configured to receive information on a measurement of the one or more downlink resources, wherein the measurement has been conducted by a reference device. And/or, the user equipment 220 may, e.g., be configured to receive information on a measurement of one or more uplink resources, wherein the measurement has been conducted by the base station measuring an uplink transmission by the reference device.

In an embodiment, the user equipment 220 may, e.g., be configured to receive a request for conducting a position method depending on an uplink transmission, wherein the user equipment 220 may, e.g., be configured to conduct the positioning method in response to the request for conducting the position method depending on the uplink transmission. And/or, the user equipment 220 may, e.g., be configured to receive a request for conducting a position method depending on a downlink transmission, wherein the user equipment 220 may, e.g., be configured to conduct the positioning method in response to the request for conducting the position method depending on the downlink transmission.

According to an embodiment, the user equipment 220 may, e.g., be configured to provide the further network entity an indication on whether one or more measurements on one or more identifiers of the one or more downlink resources or of one or more downlink resource sets comprising the one or more downlink resources are spatially associated with one or more identifiers of one or more uplink resources.

In an embodiment, the user equipment 220 may, e.g., be configured to provide the further network entity an indication on whether one or more measurements on one or more identifiers of the one or more downlink resources or of one or more downlink resource sets comprising the one or more downlink resources are spatially associated with one or more identifiers of one or more uplink resources at a given time.

According to an embodiment, the user equipment 220 may, e.g., be configured to receive from the further network entity an indication on whether one or more identifiers of the one or more downlink resources or of one or more downlink resource sets comprising the one or more downlink resources are spatially associated with one or more identifiers of one or more uplink resources.

In an embodiment, the user equipment 220 may, e.g., be configured to provide the further network entity an indication on whether one or more Receive-Transmit measurements on one or more identifiers of the one or more downlink resource or one or more downlink resource sets comprising the one or more downlink resources are spatially associated with one or more identifiers of one or more uplink resources.

According to an embodiment, the user equipment 220 may, e.g., be configured to receive from the further network entity an indication on whether one or more Receive-Transmit measurements on one or more identifiers of the one or more downlink resource or one or more downlink resource sets comprising the one or more downlink resources are spatially associated with one or more identifiers of one or more uplink resources.

In an embodiment, the user equipment 220 may, e.g., be configured to perform one or more measurements on the one or more downlink resources and to use one or more resulting measurement results to request or to recommend from the base station or from the further network entity to configure new downlink resources or to modify existing downlink resources with defined spatial filter configurations or defined beam directions. (Such an embodiment may, e.g., be user initiated.)

According to an embodiment, the user equipment 220 may, e.g., be configured to provide the defined spatial filter configurations or the defined beam directions to the base station or to the further network entity.

In an embodiment, the further network entity implements a location management function.

According to an embodiment, the user equipment 220 may, e.g., be configured to receive an indication on one or more transmit spatial filters or on the one or more receive spatial filters or on the one or more beam directions from the base station.

In an embodiment, the user equipment 220 may, e.g., be configured to receive to the indication on the one or more transmit spatial filters or on the one or more receive spatial filters or on the one or more beam directions via a physical layer or via a higher layer.

According to an embodiment, the user equipment 220 may, e.g., be configured to receive the indication on the one or more transmit spatial filters or on the one or more receive spatial filters or on the one or more beam directions via a Transmission Configuration Indicator state reference.

Figure 11:
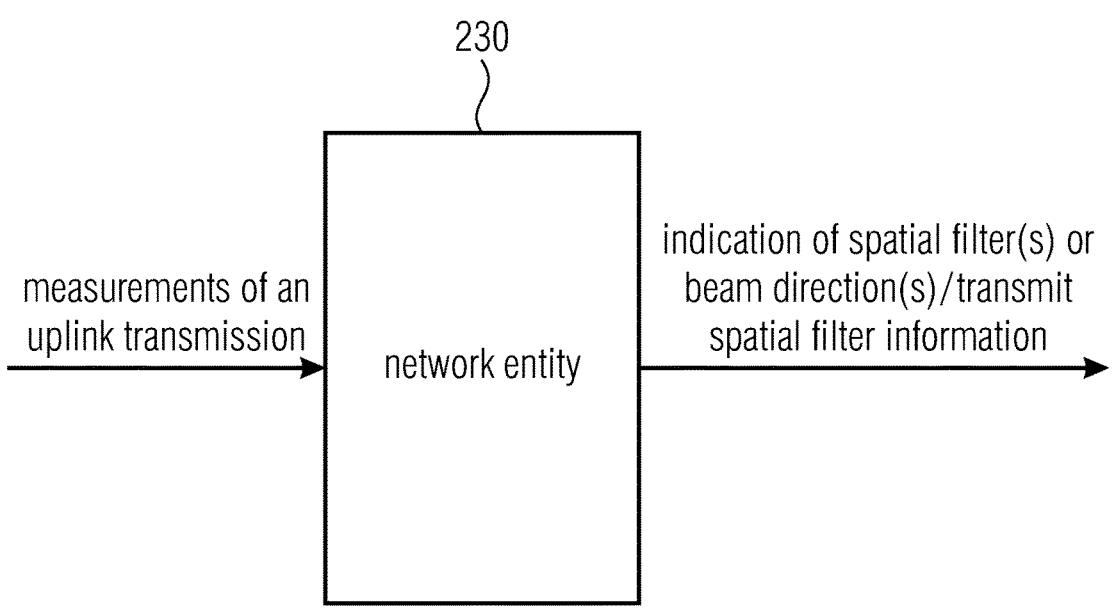
FIG. 11 illustrates a network entity of a wireless communication system for providing transmit or receive spatial filter information according to an embodiment.

FIG. 11 illustrates a network entity 230 of a wireless communication system for providing transmit or receive spatial filter information according to an embodiment.

The network entity 230 is configured to receive information from a first base station and/or a measurement report from a second base station including measurements of an uplink transmission by an uplink resource transmitted from one or more user equipments.

Moreover, the network entity 230 is configured to determine direction information depending on the information and/or depending on the measurement report.

Furthermore, the network entity 230 is configured to map the direction information for one or more uplink resources and/or one or more downlink resources.

Moreover, the network entity 230 is configured to provide a message to the second base station comprising an indication of one or more spatial filters or one or more beam directions for one or more downlink transmissions by one or more downlink resources and/or for one or more uplink receptions by one or more uplink resources. And/or the network entity 230 is configured to provide a message to a user equipment of the wireless communication system, wherein the message comprises one or more configurations indicating the transmit spatial filter information on one or more uplink resources, wherein the message comprises information on one or more spatial filters or one or more beam directions for receiving one or more downlink transmissions by one or more downlink resources.

Figure 12:
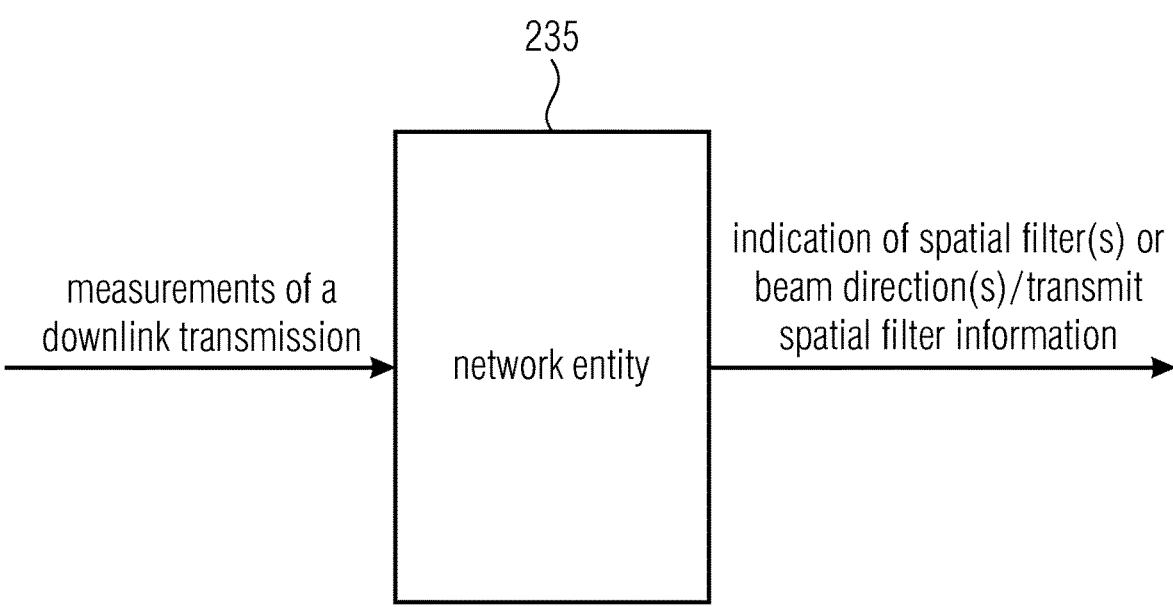
FIG. 12 illustrates a network entity of a wireless communication system for providing transmit or receive spatial filter information according to another embodiment.

FIG. 12 illustrates a network entity 235 of a wireless communication system for providing transmit or receive spatial filter information according to another embodiment.

The network entity 235 is configured to receive information from a first base station and/or a measurement report from a measurement device including measurements of a downlink transmission by a downlink resource transmitted from a second base station.

Moreover, the network entity 235 is configured to determine direction information depending on the information and/or depending on the measurement report.

Furthermore, the network entity 235 is configured to map the direction information for one or more uplink resources and/or one or more downlink resources.

Moreover, the network entity 235 is configured to provide a message to the second base station comprising an indication of one or more spatial filters or one or more beam directions for one or more downlink transmissions by one or more downlink resources and/or for one or more uplink receptions by one or more uplink resources. And/or the network entity 235 is configured to provide a message to a user equipment of the wireless communication system, wherein the message may, e.g., comprise one or more configurations indicating the transmit spatial filter information on one or more uplink resources, wherein the message comprises information on one or more spatial filters or one or more beam directions for receiving one or more downlink transmissions by one or more downlink resources.

According to an embodiment, the network entity 230, 235 implements a location management function.

In an embodiment, the indication may, e.g., comprise one or more identifiers of the one or more uplink resources and/or of one or more uplink resource sets comprising the one or more uplink resources, wherein the one or more identifiers indicate the at least one initial spatial filter or the at least one initial beam direction for the transmission of one or more downlink resources. And/or, the indication may, e.g., comprise one or more identifiers of one or more downlink resources and/or of one or more downlink resource sets comprising the one or more downlink resources, wherein the one or more identifiers indicate the at least one initial spatial filter or the at least one initial beam direction for the reception of one or more uplink resources.

According to an embodiment, the indication may, e.g., comprise one or more further identifiers of the one or more uplink resources and/or of the one or more uplink resource sets to indicate at least one further spatial filter or at least one further beam direction for the reception of another one or more uplink resources. And/or, the indication may, e.g., comprise one or more further identifiers of the one or more downlink resources and/or of the one or more downlink resource sets to indicate at least one further spatial filter or at least one further beam direction for the transmission of another one or more downlink resources.

In an embodiment, the indication may, e.g., comprise one or more identifiers of the one or more uplink resources, wherein each of the one or more identifiers may, e.g., be associated with a single uplink resource of the one or more uplink resources or with a single uplink resource set of the one or more uplink resource sets.

According to an embodiment, the indication may, e.g., comprise one or more identifiers of the one or more downlink resources, wherein each of the one or more identifiers may, e.g., be associated with a single downlink resource of the one or more downlink resources or with a single downlink resource set of the one or more downlink resource sets.

In an embodiment, the one or more identifiers may, e.g., be associated with the one or more uplink resources. The network entity 230, 235 may, e.g., be configured to determine for each uplink resource of the one or more uplink resources or for each uplink resource set of the one or more uplink resource sets, depending on a spatial filter settings or a beam direction setting, the one or more transmit spatial filters or the one or more beam directions for the one or more downlink resources.

According to an embodiment, the network entity 230, 235 may, e.g., be configured to transmit a request message to the first base station to perform one or more uplink resource measurements of the one or more uplink resources. The measurement request message may, e.g., comprise an indication on the at least one initial spatial filter or an indication on the at least one initial beam directions for the one or more uplink resource measurements and/or an indication of the type of the measurement.

Figure 13:
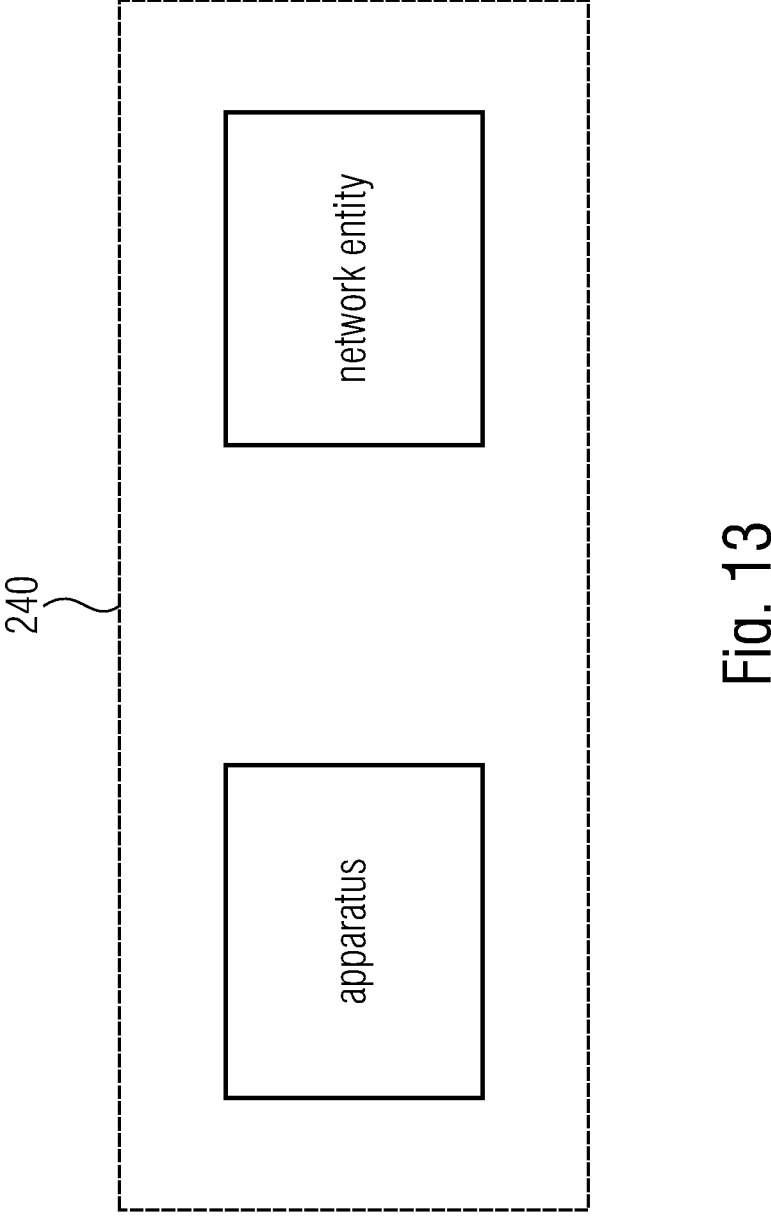
FIG. 13 illustrates a wireless communication system according to an embodiment.

FIG. 13 illustrates a wireless communication system 240 according to an embodiment.

The wireless communication system 240 comprising the apparatus 210 according to FIG. 9.

Moreover, the wireless communication system 240 comprises the further network entity from which the apparatus 210 of FIG. 9 receives the first message and the second message. Or, the wireless communication system 240 comprises the network entity 230 of FIG. 11 or the network entity 235 of FIG. 12.

According to an embodiment, the wireless communication system 240 may, e.g., comprise the user equipment 220 of FIG. 10.

In the following, definitions are provided, and particular embodiments of the invention are described.

At first, a definition for a network entity/node is provided. The network node may be an LMF (Location Management Function) or an LS (Location Sever) located in the core network or a local LMF within the radio access network providing the BSs in the network with beam information. The LMF may manage the support of different location services for target UEs, including positioning of UEs and delivery of assistance data to UEs. The LMF may interact with the serving BS for a target UE in order to obtain position measurements for the UE, including uplink measurements made by a BS.

The network node may interact with a target UE in order to deliver assistance data if requested for a particular location service, or to obtain a location estimate if that was requested. The network node may interact with multiple BSs to provide assistance data information for broadcasting.

For positioning of a target UE, the network node may decide on the position methods to be used, based on factors that may include the LCS Client type, the used QoS, UE positioning capabilities, BS positioning capabilities. The positioning methods may yield a location estimate for UE-based position methods and/or positioning measurements for UE-assisted and network-based position methods. The network node may combine all the received results and determine a single location estimate for the target UE (hybrid positioning). Additional information like accuracy of the location estimate and velocity may also be determined.

In the following, a definition for a BS is provided.

The BS is a network element of the Radio Access Network (RAN) or the Next Generation Radio Access Network (NG-RAN) that may provide measurement information for a target UE and communicates this information to a network node. To support RAT-Dependent positioning, the BS may make measurements of radio signals for a target UE or a Reference device, and provide measurement results for position estimation. A BS may serve several BSs or TRPs, including for example remote radio heads, reception-only points (RPs) and transmission-only points (TPs). A BS may broadcast assistance data information, received from an LMF, in positioning System Information messages.

In some scenario, a set of the TRPs are not static (or non-stationary). The non-stationary TRP position or trajectory can be known at the core network or for the TRP itself or for communication or position estimation entity where the entity.

In one example the non-stationary TRP is an Non-Terrestrial Network (NTN) or Aerials Network (drones) or a vehicle or a moving device wherein the position of the transmit antenna corresponding to non-stationary TRP at the time of transmission or reception is known to the positioning entity (UE in UE-based mode and Network node in UE-assisted or Network-based modes).

In the following, DL-RSs, Downlink Reference Signals, are considered.

Downlink Reference Signals (DL-RS(s)) described herein as reference signals transmitted from an apparatus being a base-station, reference device or positioning TRP/TP or the like.

DL-RSs may be used to enable downlink positioning measurements for DL methods or UL and DL methods such as TDOA, RTT, multi-RTT or DL-AoD. DL-RS(s) may be referred to those skilled in the art as DL-PRS, LTE PRS, SL-PRS or any downlink or sidelink reference signal used for the purpose of positioning. The DL-RS may correspond to a specific positioning reference signal (PRS) or a communication reference signal used for the purpose of positioning such SSB or CSI-RS.

A DL-RS resource set is defined as a set of one or more DL-RS resources where each resource has a DL-RS resource ID. In one option, the DL-RS resource(s) in a DL-RS resource set may be associated with the same TRP or frequency layer. Each DL-RS resource ID in the DL RS resource set can be associated with a specific spatial filter. A TRP may be configured with multiple DL-RS resource sets. A DL-RS resource set consists of one or more DL-RS resources and it is provided with multiple parameters. The parameters may include a time-domain behavior or periodicity and slot offset. In the case of DL-PRS, the Information Element Periodicity-and-ResourceSetSlotOffset-r16 defines the DL-PRS resource periodicity per DL-PRS resource set. All the DL-PRS resource(s) within one DL-RS resource set are configured with the same DL PRS resource periodicity. Semi-persistent scheduling allocates DL resources with a certain period over a defined interval. For the case of aperiodic DL-PRS, a periodicity value is not configured.

A BS or a TRP may transmit multiple DL-RS resource sets, each containing one or more DL-RS resources. A DL-RS resource set can be associated with a collection of beams (wherein each DL-RS resource corresponds to or is associated with a beam) transmitted with a configured periodicity in configured offsets. Some sets would be configured with a given periodicity.

A DL-RS positioning frequency layer is defined as a collection of DL-RS resource sets that have common parameters and may be configured by a higher parameter PositioningFrequencyLayer.

The DL-RS resources and resource set configurations are provided to an UE on a higher layer interface such as LPP (LTE Positioning Protocol) from the LMF, or possibly from a serving cell over an RRC or MAC-CE (Medium Access Control-Control Element) message or via the DCI (Downlink Control Information). The UE performs the measurements on the configured DL-RS resources.

The UE or a reference device may be configured for measurements of one or more DL-RS or SL-RS resources. The RS may be a DL-PRS or a SL-PRS resource. The configuration may be provided to the UE via a higher layer configuration message which includes assistance information on the DL-RS resources transmitted from one or more BS(s) or TRP(s). The assistance information for the DL-RS (s) or SL-RS(s) may include one or more of the following information: ResourceSet, ResourceSetId, Periodicity, Resource RepetitionFactor, ResourceTimeGap, SFN0-Offset, ResourceSetSlotOffset, Resource, ResourceId, SequenceId, CombSizeN, ReOffset, ResourceSlotOffset, ResourceSymbolOffset, NumSymbols, QCL-Info, SubcarrierSpacing, CyclicPrefix, ResourceBandwidth, StartPRBDL-RS-PointA, RstdReferenceInfo, RstdMeasurementInfoRequest, UE-Rx-Tx-MeasurementInfoRequest, expectedRSTD, RSTD-uncertainty, Muting Pattern.

A configuration entity being the network entity or a serving base station may provide or update the UE or the reference device with a DL-RS or SL-RS measurement configuration. In one example, the configuration may be indicated as IEs (Information Elements) over a higher layer interface like LPP for the case the configuration entity being an LMF. The configuration may be indicated via RRC, or MAC-CE, or DCI if the configuration entity is a base station. The configuration may be indicated via PC5 (sidelink) interface for the case the configuration entity being an UE or a reference device.

The network entity may configure the BS or reference device for a transmission configuration on one or more DL-PRS or SL-PRS resources. The configuration entity provides the UE with a high layer configuration message which includes assistance information on the DL-PRS resources received from one or more TRPs. The configuration entity provides or updates the TRP with one or more DL-PRS configuration(s) which is/are indicated as IE(s) (Information Element(s)) over a higher layer interface, like NRPPa (NR Positioning Protocol A) for the case the configuration entity being an LMF, or one of the following Xn, F1 or X2 for the case the configuration entity being a base station or PC5 (sidelink) interface for the case the configuration entity being an UE.

In the following, UL-RS(s), Uplink Reference Signal(s), is/are considered.

Uplink Reference Signal(s) (UL-RS(s)) described herein is/are reference signals transmitted from an apparatus being a UE or a reference device or the like. UL-RS(s) may be referred to those skilled in the art as UL-PRS, SRS-for-positioning, SL-PRS or any uplink or sidelink reference signal used for the purpose of positioning.

The UL reference signals are transmitted by an UE or a reference device and may be a dedicated positioning reference signal such UL-PRS or SRS used or configured for positioning or a communication reference signal used for the purpose of positioning (e.g., SRS used or configured for MIMO). The configuration of the UL-PRS or SRS resource set and resources are determined by the higher layer configuration over a higher interface such as LPP from the LMF or possibly from a serving cell over RRC or MAC-CE or DCI messages.

An SRS resource set is defined as a set comprising one or more SRS resources, wherein each resource has a SRS resource ID and may comprise one or more of the following:

SRS configuration: List of resources and resource sets to be added or removed,

The maximum number of SRS resources per set for positioning (N),

The maximum number of supported SRS resource sets for positioning is a UE capability, with configurability of up to N resource sets per bandwidth part (BWP), SRS resource list within the set, Triggering types for resources within a set (Periodic, SP: Semi-Persistent, Aperiodic), SRS power control parameters including the Alpha and P0 value as well as the reference signal used for path loss determination.

Figure 4:
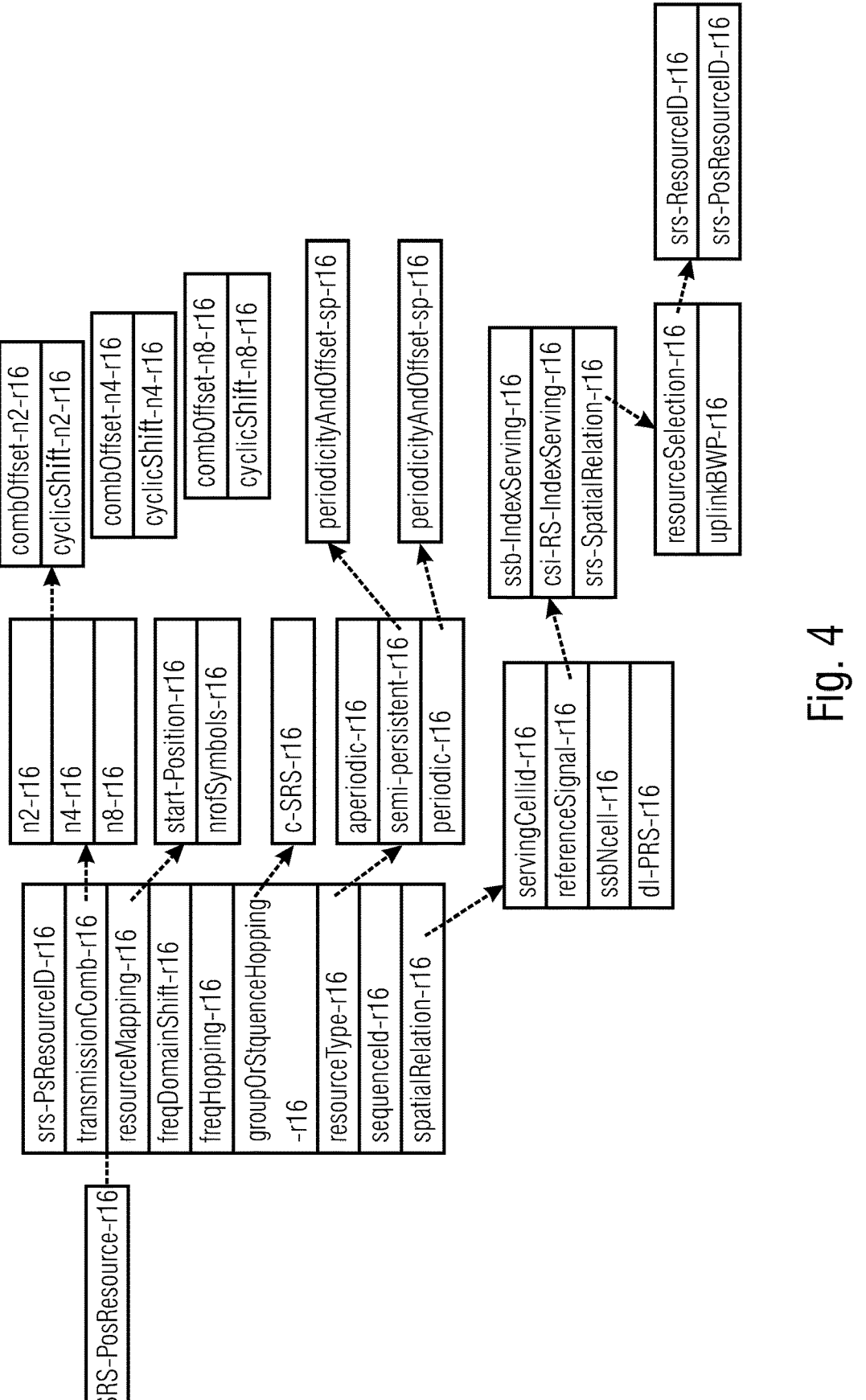
FIG. 4 illustrates a SRS-Position resource release 16 configuration.

An example of the resource IEs for SRS are provided in 4. FIG. 4. FIG. 4 illustrates a SRS resource configuration.

The configuration entity (serving gNB or LMF) configures the UE for a transmission of one or more UL-PRS, or SRS or SL-PRS resources. The configuration entity provides the UE with a high layer configuration message which includes assistance information on the UL-PRS or SRS resources received from one or more TRPs. The assistance information for the UL-PRS or SRS may include one or more of the following information: SRS-ResourceSetId, SRS-ResourceId, UL BWP ID, Serving cell ID, PCI of the cell, ssbFrequencyhalfFrameIndex, SSB-periodicity, ssb-SubcarrierSpacing, SFN-SSBoffset, SMTC, SSB Index, SFN0 Offset, ss-PBCH-BlockPower ID, DL-PRS-ResourceSetId, DL-PRS-ResourceId, NZP-CSIRS-ResourceID, servingCellId. The configuration entity may be an entity in the core network or a base station or an UE.

The configuration entity provides or updates the UE with one or more UL-PRS configuration(s). The configuration(s) is/are indicated as IE(s) (Information Elements) by the LMF over a higher layer interface like LPP. The configuration(s) are indicated by the base station over one of the following RRC, MAC-CE, DCI. The configuration(s) may be indicated via PC5 (Sidelink) from a second UE.

In the following, a general definition for SL PRS resources are provided.

The Sidelink (SL) reference signals are transmitted by a UE, reference device or a sidelink apparatus such as a road side unit (RSU) and be a dedicated positioning reference signal such SL-PRS or SRS-for-positioning or a communication or synchronization reference signal used for the purpose of positioning such as SPSS or SSSS.

In the following, a general definition for a spatial filter is provided.

A spatial domain filter or a spatial filter refers to a precoding or a filtering employed at the antenna ports of a communication device. The precoding or filtering may be performed or implemented in the analog or digital domain or a combination of them (hybrid) on a transmitted or a received signal. This results in the formation of a spatially selective or directive transmission or reception by the device that is referred to as a transmit or a receive beam, respectively. The term "spatially selective" or "spatially directive" means that the beam formed via a spatial filter or a spatial domain filter enables the transmission or reception of a signal with higher gain in certain spatial directions. A transmit/transmission/Tx beam denotes a spatially selective/directive transmission obtained from a spatial filter. A receive/reception/Rx beam denotes a spatially selective/directive reception obtained from a spatial filter.

In the following, a general definition for a QCL relation is provided.

Two antenna ports are said to be quasi co-located (QCL) if properties of the channel over which a symbol on one antenna port is conveyed can be inferred from the channel over which a symbol on the other antenna port is conveyed.

Spatial parameter(s) for QCL in NR describes the spatial channel properties of the RS antenna ports observed at the receiver which can consider one or more of the following parameters: Angle of Arrival (AoA), Dominant AoA, average AoA, Power Angular Spectrum (PAS) of AoA, Angle of Departure (AoD), average AoD, PAS of AoD, transmit/receive channel correlation, transmit/receive beamforming, spatial channel correlation etc.

The spatial Rx parameters for QCL in NR describe the spatial channel properties of the RS antenna ports observed by a network entity.

| QCL Type | Description |
|---|---|
| QCL-TypeA | doppler shift, Doppler spread, average delay, delay spread |
| QCL-TypeB | doppler shift, doppler spread |
| QCL-TypeC | average delay, doppler shift |
| QCL-TypeD | spatial Rx parameter |

In one example, the QCL parameter type A or type B can be used to indicate that a target reference signal (RS) or a target signal and a source or a reference RS (RS provided in the QCL setting) are transmitted from the same TRP using different beams, hence the Doppler information can be assumed to be similar and the apparatus is not required to derive it for the target signal or RS.

In an another example, the target RS and the reference or source RS can be indicated that they fall into similar angle of arrival, hence the same Rx spatial filter can be applied by the apparatus. This is indicated by QCL-TypeD parameter.

In the following, measurement time instants, report and configuration are described.

A measurement device, measuring DL-RS(s) may be able to report multiple measurement instances of DL-RS(s) (RSTD, DL RSRP, and/or UE Rx-Tx time difference measurements) in a single measurement report to the network node for UE-assisted positioning. A measurement device, measuring UL-RS(s) may be able to report multiple measurement instances (RTOA, UL RSRP, and/or gNB Rx-Tx time difference measurements) in a single measurement report to a network node. A measurement instance may include measurement information from one or more measurement occasion(s) which may be obtained by averaging over multiple occasions. A measurement instance may also refer to one or more measurements of the same or different types, which are obtained from the same DL-RS/UL-RS. The measurement device may report the one or measurement instances with one or more timestamps. In one example, two measurement results reported with the same timestamp for the same DL-RS or UL-RS measurement may correspond to different reception characteristics at the measurement device. In embodiments, a measurement device may, e.g., be a base station, or may, e.g., be a TRP, or may, e.g., be a UE, or may, e.g., be another network entity of a wireless communication system.

A measurement device may be configured to report one or more measurement instances of the DL-RS/UL-RS resources or resource sets or a measurement time occasion. In one example, the measurement device may be configured to report one or more measurement results with the time-stamp information for one or more DL-RS or UL-RS measurement instances.

A transmission device may be configured to transmit one or more reference signal(s) where the configuration includes one or more parameter(s) with time information. The transmission device may apply the parameter(s) at the indicated time for transmitting the configured reference signal(s).

In the following, a method performed by a base station according to embodiments are described. There is also provided a base station or gNB, wherein the base station or gNB is operative to perform any one of the subject-matter of method steps described below.

As a major concept for a base station of embodiments, an LMF provides a TRP with information on the direction or spatial filter to apply.

In accordance with embodiments, a method is provided, which is performed by a base station, BS, the method comprising:

receiving (201.a, 201.b, 201.c), from a network node, LMF, a first message indicating a measurement request or an information request or a positioning activation request, receiving (202), from the network node, LMF, a second message comprising an indication of at least a spatial filter or beam direction for transmission of one or more downlink, DL, resource(s) and/or reception of one or more uplink, UL, resource(s);

determining one or more transmit and/or receive spatial filter(s) or beam direction(s) based on the indication (202), applying the spatial filter(s) or beam directions(s) to one or more DL RS(s) and/or one or more UL RS(s) in response to the first message.

In accordance with embodiments, the indication (202) comprises at least one or more identifier(s), ID(s), of one or more UL resource(s) and/or UL resource set(s) to indicate at least a spatial filter or beam direction for the transmission of one or more DL resource(s) and/or one or more ID(s), of one or more DL resource(s) and/or DL resource set(s) to indicate at least a spatial filter or beam direction for the reception of one or more UL resource(s).

In accordance with embodiments, the indication (202) comprises at least one or more identifier(s), ID(s), of one or more UL resource(s) and/or UL resource set(s) to indicate at least a spatial filter or beam direction for the reception of another one or more UL resource(s) and/or one or more ID(s), of one or more DL resource(s) and/or DL resource set(s) to indicate at least a spatial filter or beam direction for the transmission of another one or more DL resource(s).

In accordance with embodiments, the indication (202) comprises one or more ID(s) of one or more UL resource(s), wherein each ID is associated with a single UL resource or resource set.

In accordance with embodiments, the indication (202) comprises one or more ID(s) of one or more DL resource(s), wherein each ID is associated with a single DL resource or resource set.

In an exemplary embodiment, the one or more ID(s) is/are associated with one or more UL resource(s). The base station determines for each UL resource or set based on the spatial filter settings or beam direction settings at least one transmit spatial filter or beam direction for one or more DL RS(s). In some examples, the one or more DL RS(s) may be indicated by the network node, LMF, to the BS. The determined transmit spatial filter(s) or beam directions(s) are applied by the BS for the transmission of the one or more DL RS(s). In an exemplary embodiment, the one or more ID(s) is/are associated with one or more DL resource(s). The base station determines for each DL resource or set based on the spatial filter settings or beam direction settings at least one receive spatial filter or beam direction for one or more UL RS(s). In some examples, the one or more UL RS(s) may be indicated by the network node, LMF, to the BS. The determined receive spatial filter(s) or beam directions(s) are applied by the BS for the reception of the one or more UL RS(s).

In an exemplary embodiment, the one or more ID(s) is/are associated with one or more UL resource(s). The base station determines for each UL resource or set, based on the spatial filter settings or beam direction settings, at least one receive spatial filter or beam direction for one or more other UL RS(s). In some examples, the one or more other UL RS(s) may be indicated by the network node, LMF, to the BS. The determined receive spatial filter(s) or beam directions(s) are applied by the BS for the reception of the one or more other UL RS(s). In an exemplary embodiment, the one or more ID(s) is/are associated with one or more DL resource(s). The base station determines for each DL resource or set based on the spatial filter settings or beam direction settings at least one transmit spatial filter or beam direction for one or more other DL RS(s). In some examples, the one or more other DL RS(s) may be indicated by the network node, LMF, to the BS. The determined transmit spatial filter(s) or beam directions(s) are applied by the BS for the transmission of the one or more other DL RS(s).

In accordance with embodiments, one or more second messages (202) can be associated with the first message or can be a part of the first message (201.a, 201.b, 201.c).

In the following, an example for a first message received by a BS according to an embodiment is described.

Figure 5:
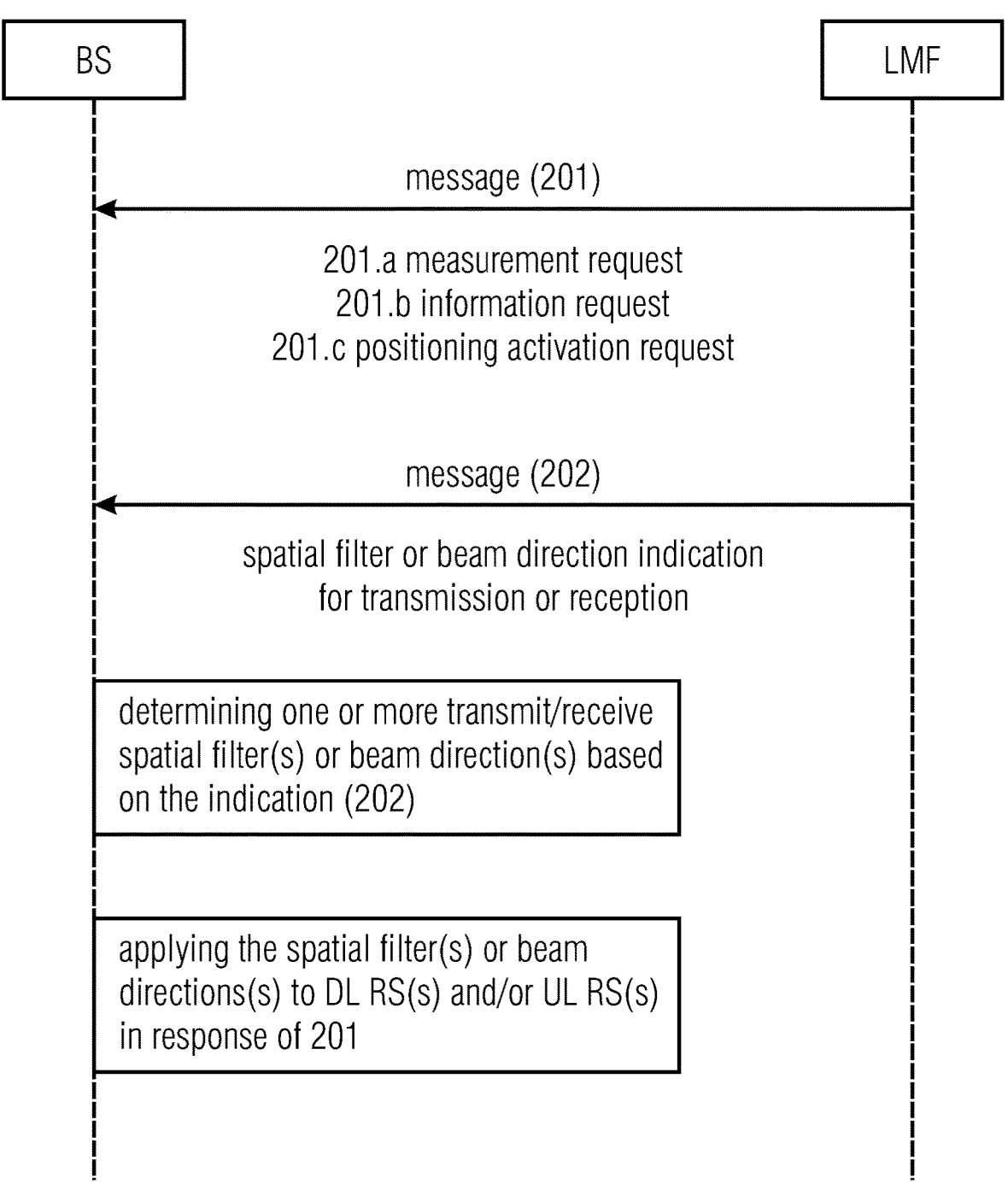
FIG. 5 illustrates a communication between a BS and an LMF.

FIG. 5 illustrates a communication between a BS and an LMF.

In a corresponding embodiment, the BS may receive a request message from an LMF to perform one or more measurement(s) of one or more UL-RS(s). The measurement request (201.a) includes an indication of at least a spatial filter or beam direction information for the one or more UL-RS(s) measurements and/or an indication of the type of the measurement. In some examples, the measurement type may correspond to "RSRP", "RTOA", "Rx-Tx-Time-difference", or "AoA", or a combination thereof. The measurements are performed by the base station on the one or more UL RS resource(s) associated with one or more UL resource set(s).

When the BS receives a measurement request or a measurement request update on one or more UL-RS(s), the measurement request message can include information on the spatial filter or the beam direction. An example on the configuration information in a measurement request from an LMF to a BS is shown in Table 1, where the information is a part of the BS measurement request list or a part of the measurement quantities information (or UL-RS configuration) as shown in Table 2.

TABLE 1

The beam direction or spatial filter information
is a part of the BS measurement request list

| IE/Group Name | Presence | Range |
|---|---|---|
| Message Type | M | |
| NRPPa Transaction ID | M | |
| LMF Measurement ID | M | |
| BS Measurement Request List | 1 | |
| >BS Measurement Request Item | | 1 . . . <maxnoofMeasTRPs> |
| >>BS ID | M | |
| >>UL-RS direction information | O | 1 . . . <maxnoPosMeas> |
| >>Spatial filter indication | O | 1 . . .<maxnoPosMeas> |

TABLE 2

The beam direction or spatial filter information is a part of the
BS measurement quantities information or UL-RS configuration.

| IE/Group Name | Presence | Range |
|---|---|---|
| BS Measurement Quantities | | 1 . . . <maxnoPosMeas> |
| SFN initialisation Time | O | |
| UL-RS Configuration | O | |
| >>UL-RS direction information | O | |
| >>Spatial filter indication | O | |
| System Frame Number | O | |
| Slot Number | O | |

In a corresponding embodiment, the BS provides to the network node, LMF, information on the spatial filter or the beam direction. In some examples, the BS may provide information on the spatial filter or the beam direction in response to a measurement request (201.a). The information can include one or more ID(s) of one or more DL resource(s), wherein each ID is associated with a single DL resource or resource set. The information can include one or more ID(s) of one or more UL resource(s), wherein each ID is associated with a single UL resource or resource set. The information can include one or more ID(s) of one or more UL resource(s) or set(s) and/or one or more DL resource(s) or set(s) indicated in message (202) or indicated in response of the request in (201.b).

The information can include one or more ID pairs, wherein each ID pair comprises at least two IDs, wherein the first ID is associated with an UL resource and the second ID is associated with a DL resource, or the first ID is associated with a DL resource and the second ID is associated with an UL resource. For the UL/DL resources associated with an ID pair, a correspondence between their related transmit and receive spatial filters or beam directions may exist. In another instance, the information can include one or more ID pairs, wherein each ID pair comprises at least two IDs, wherein the first ID is associated with a DL resource and the second ID is associated with another DL resource, or the first ID is associated with an UL resource and the second ID is associated with another UL resource. For the DL/DL or UL/UL resources associated with an ID pair, a correspondence between their related spatial filters or beam directions may exist.

In a corresponding embodiment, the BS may receive in the measurement request message (201.a) requesting the BS to provide a time information for the reception of one or more UL resource(s) over one or more measurement instance(s) in the measurement report(s). In some options, the BS may provide information on the applied receive spatial filters for the reception of one or more UL resource(s). In some options, the BS may provide for one or more measurements associated with one or more measurement reports the same time information (e.g. timestamp) for the same UL resource(s) ID(s). This means, multiple measurements are performed by the BS on the same UL resource(s) simultaneously using different receive spatial filters and/or beam directions and/or different component carriers.

In a corresponding embodiment, the BS may receive a message from an LMF including an information request on one or more DL-RS configuration(s). The BS may provide in response the LMF with information on the DL-RS configuration(s) comprising at least: one or more identifier(s) for one or more DL-RS resources, wherein the resource(s) belong(s) to one or more resource set IDs corresponding to a BS ID at a given frequency layer.

In one embodiment, the LMF may request from the BS to modify (e.g., the direction of) one or more transmit spatial filters associated with one or more DL-RS resource(s). The ID(s) of the DL-RS resource(s) may be reported by the BS triggered by the LMF request in message (201.a) or message (201.b). In one example, the BS may receive from the LMF a configuration message (202) including an indication of at least a spatial filter or beam direction for transmission of at least one or more DL-RS resource(s).

In one embodiment, the LMF may request from the BS to modify (e.g., the direction of) one or more receive spatial filters corresponding to one or more UL-RS resource(s). The ID(s) of UL-RS are reported by a BS triggered by the LMF request in message (201.a) or message (201.b) or generated from a BS measurement report.

In the following, an example for a first message received by a BS 201c according to an embodiment is described.

In a corresponding embodiment, the BS may receive a message from an LMF to indicate an activation or triggering of a DL-RS transmission. The BS may provide the LMF with an activation response or an activation failure on the provided activation request. The BS receives after the activation response a configuration message (202) including an indication of at least a spatial filter or beam direction for the transmission of at least one DL resource and/or one or more identifier(s), ID(s), of one or more activated or triggered downlink, DL, resource(s).

In the following, an example for a configuration message 202 according to an embodiment is described:

In accordance with embodiments, the BS receives a configuration message (202), from the LMF or any other network node, including an indication of a spatial direction and/or beam direction for one or more DL-RS resource(s). In some examples, the BS may receive an explicit directional angle information (e.g., angle of arrival) or a geographical area indication indicating a beam direction.

In an exemplary embodiment, the BS may receive from the LMF, as a part of the configuration message (202), an indication comprising a spatial filter information. The indication may include at least a DL RS indication and/or one or more identifier(s), ID(s), of one or more DL resource(s) or set(s) corresponding to one or more DL RS transmitted by the BS. The spatial filter information may include at least one UL RS indication and/or one or more identifier(s), ID(s), of one or more UL resource(s) or set(s) corresponding to the UL RS received by the BS.

In an exemplary embodiment, the BS may receive from the LMF, as a part of the configuration message (202), an indication or information for the transmission of one or more DL RSs. The indication or information may include at least one ID of one or more reference DL RSs. The BS may use the information or indication to determine one or more transmit spatial filters for the DL-RSs having similar direction characteristics as a reference DL-RS. In some examples, a similar direction characteristic means that as at least one DL-RS overlaps in the spatial domain with the reference DL-RS.

In an exemplary embodiment, the BS may receive from the LMF, as a part of the configuration message (202), an indication or information for the transmission of one or more DL RSs. The indication or information may include at least one ID for one or more reference UL RSs. The BS may use the information or indication to determine one or more transmit spatial filters for the DL-RSs having similar direction characteristics as the spatial filter used for the reception of the one or more reference UL-RS(s). In some examples, a similar direction characteristic means that at least one DL-RS overlaps in the spatial domain with the reference UL-RS.

In an exemplary embodiment, the BS may receive from the LMF, as a part of the configuration message (202), an information or indication for the reception of at least one UL RS. The information may include an ID for one or more reference UL RSs. The BS may use the information or indication to select one or more receive spatial filters for the UL-RSs reception having similar direction characteristics as the spatial filter used for the reception of the one or more reference UL-RS(s). In some examples, a similar direction characteristic means that at least one UL-RS overlaps in the spatial domain with the reference UL-RS.

In an exemplary embodiment, the BS may receive from the LMF, as a part of the configuration message (202), an information or indication for the reception of at least one UL RS. The information may include an ID for one or more reference DL RSs. The BS may use the received information to select one or more receive spatial filters for the UL-RSs reception having similar direction characteristics as the transmit spatial filter used for the transmission of the one or more reference DL-RSs. In some examples, a similar direction characteristic means that at least one UL-RS overlaps in the spatial domain with the reference DL-RS.

In corresponding embodiment, the BS may receive from the LMF, as a part of the configuration message (202), a directional Angle Information indicating in a Geographic Coordinate System (GCS) or in a Local Coordinate System (LCS) one or more of the following information:

Azimuth Angle,

Elevation Angle,

Azimuth Angle Uncertainty,

Elevation Angle Uncertainty

In corresponding embodiment, the BS may receive from the LMF, as a part of the configuration message (202), an Information indicating in a map projection area in a Geographic Coordinate System (GCS) or in a Local Coordinate System (LCS) or a relative geodetic location one or more of the following information:

X,Y,Z unit value

X value

Y value

Z value

Area Uncertainty or confidence

Area Uncertainty or confidence Type (spherical, elliptical . . . )

or one or more of the following location information:

Degrees of Latitude

Degrees of Longitude

Altitude

Delta Latitude

Delta Longitude

Delta Height

Uncertainty or confidence

Figure 6:
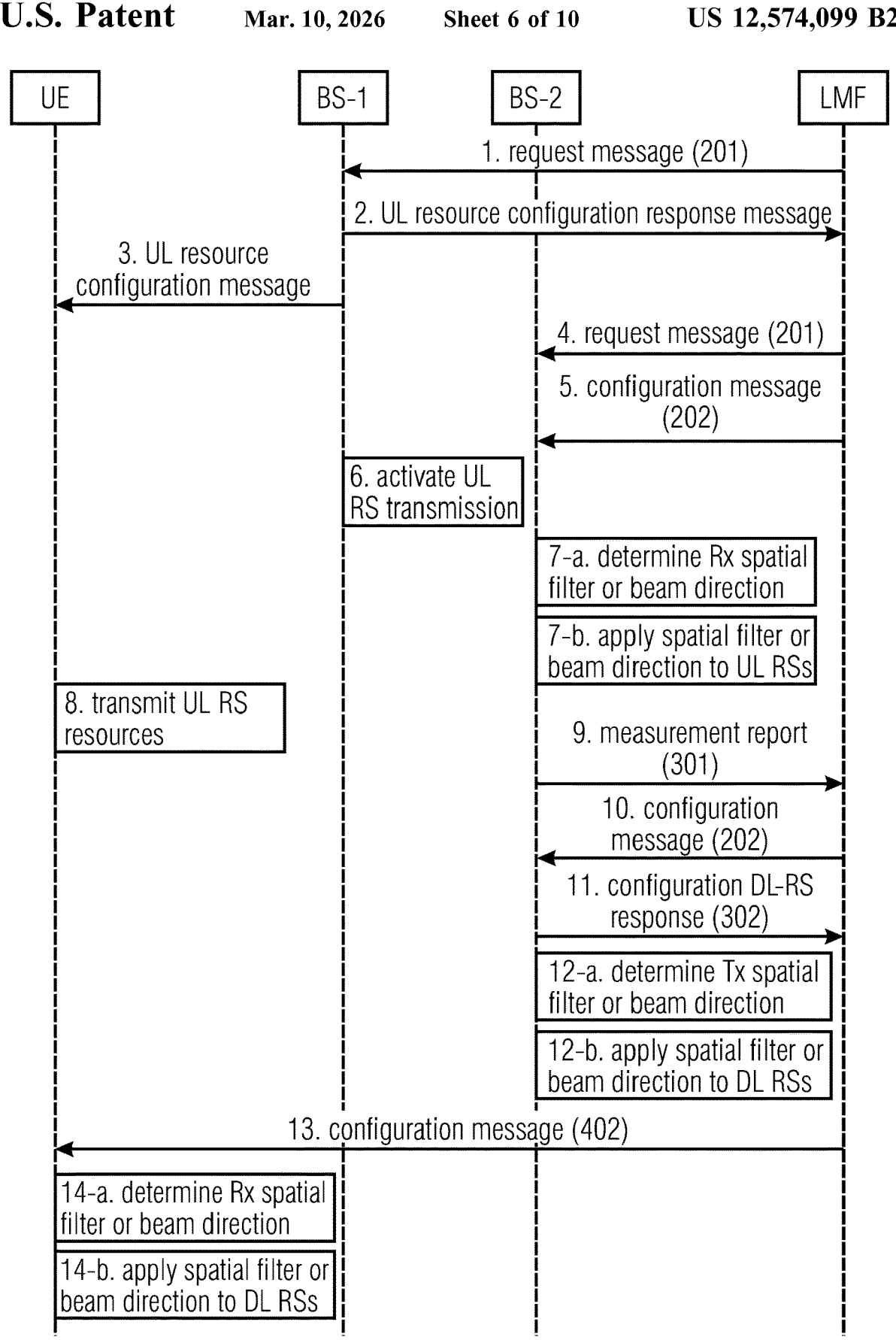
FIG. 6 illustrates an example of an UL triggered beam assistance procedure coordinated by the LMF.

In the following, an example for an uplink triggered procedure according to an embodiment is described:

FIG. 6 illustrates an example of an UL triggered beam assistance procedure coordinated by the LMF. In particular, FIG. 6 illustrates a procedure for providing more than one configuration message (202) to a second BS (BS-2) for providing one or more spatial filter(s) or beam direction(s) for the reception of one or more UL-RS(s) in stage 5 and/or the transmission of one or more DL-RS(s) in stage 10. The LMF communicates with a first BS (BS-1) and a second BS (BS-2) where the first BS can configure an apparatus on a primary or a secondary cell for an UL-RS transmission. The second BS may not be able to configure or directly communicate with the apparatus.

In one example, a first BS may receive a message from an LMF including an information request (201.b) requesting information on one or more UL-RS configuration(s) configured to the apparatus by the first BS. The first BS may respond to the LMF and provide information on one or more UL-RS resources and/or one or more UL-RS resource sets.

For UL-RS sounding for positioning purpose, at least two options may exist for the procedure after the measurement of the UL-RS resources (in stage 7-b of FIG. 6). After the measurement of the UL-RS resources, the LMF indicates the spatial filter for DL-RS(s) (via indication 202) to the base station by indicating the ID(s) of the UL RS(s) that is/are to be used for the DL beamforming (in stage 10 of FIG. 6). This indication may be performed by the LMF either along with the indication of the ID of the DL RS that has to be applied with said spatial filter or without it.

In accordance with an embodiment, the base station is configured to receive from a network node, LMF, an indication of one or more ID(s) of UL resource(s) or resource set(s) and the ID(s) of one or more DL resource(s), wherein the spatial filter or beam direction to be used for the transmission of the indicated DL resource(s) is derived from the spatial filter or beam direction used for the reception of one or more of the UL resource(s) or resource set(s).

In accordance with an embodiment, the base station is configured to receive from a network node, LMF, an indication of one or more ID(s) of UL resource(s) or resource set(s), wherein the spatial filter or beam direction used for the transmission of one or more DL resource(s) or resource set(s) by the base station is derived from the spatial filter or beam direction used for the reception of the one or more indicated UL resource(s) or resource set(s) at the base station.

If the indication does not comprise the ID(s) of one or more DL RS(s), then the base station either choses the DL RS(s) that is/are beamformed on its own or the DL RS(s) to be used are known by the BS, e.g., they are provided by the NR specification. In one option, the base station may inform the LMF with the one or more ID(s) of the DL RS(s) or set(s) configured for DL-RS transmission.

In accordance with an embodiment, the base station is configured to use spatial filter(s) or beam direction(s) for one or more DL RS(s) that is/are derived from the spatial filter or beam direction of one or more UL RS(s) indicated by a network node, LMF, wherein the DL RS(s) for which the spatial filter(s) or beam direction(s) is/are to be applied is/are indicated to the base station by the LMF, or
    chosen by the base station, or
    chosen by the base station from information provided by
      the LMF, or
    known by base station (e.g., the RS(s) is/are provided in
      the NR specification).

If the base station choses the DL RS(s) to be used, it may optionally report the DL-RS(s) to the LMF.

In accordance with embodiments, the base station is configured to provide to a network node, LMF, the ID(s) of one or more DL RS(s). The DL RS(s) associated with the reported ID(s) may be the ones that it may transmit in the downlink and the report may be provided after the reception of the indication of the UL resource(s) from the LMF for the derivation of the spatial filter. The base station may obtain the spatial filter(s) or beam direction(s) for the reported DL RS(s) from the UL RS(s) that are indicated to the base station by the LMF.

As the base station uses the spatial filter or beam direction derived from one or more UL RS(s) for a DL RS, it may indicate to the UE about the application of said spatial filter or beam direction.

In accordance with an embodiment, a network node, base station, or LMF, is configured to provide to a user equipment, via the PHY layer or a higher layer, at least one of the following messages:

the UE derives the spatial filter or beam direction to
      receive a DL RS 'P' from the spatial filter or beam
      direction used to transmit an UL RS or UL RS set 'S',
      or
    the UE assumes that the spatial filter or beam direction to
      transmit a DL RS 'P' by the base station is derived from
      the spatial filter or beam direction used to receive UL
      RS or RS set 'S' at the base station.

This indication, for example, may be performed by providing a TCI-state reference (TCI=Transmission Configuration Indicator) for the DL RS 'P' with the UL RS or RS set 'S'—the DL RS 'P' may be provided a TCI-state with a QCL type 'D' association with UL RS 'S'.

This indication, for example, may also be performed by providing an LPP indication dl-RS-Info for the DL RS 'P' with the UL RS or RS set 'S'—the DL RS 'P' may be provided as a dl-RS-QCL-Info with a QCL type 'D' association with UL RS 'S'.

This procedure may happen between the UE and the base station irrespective of the DL RS selection process that happens between the base station and the LMF.

Note: Any mention of the use of one or more DL or UL resources in any of the above embodiments may also mean the use of a DL or UL resource set that comprises one or more resources.

In the following, an example for a BS receiving a configuration message (202) is described:

In accordance with embodiments, the BS may receive an information receding or following the configuration message (202). The information message may include information on whether the UL resource(s) or resource set(s) or/and the DL resource(s) or resource set(s) are originating from or/and targeting a reference device. The information message (20Y) may include one or more of the following parameters:

one or more identifier(s), ID(s), of one or more UL
      resource(s) and/or UL resource set(s) associated with
      the reference device
    one or more identifier(s), ID(s), of one or more DL
      resource(s) and/or DL resource set(s) associated with
      the reference device
    indication on the reference device type
    position information of the reference device
    directional information of the reference device In corresponding embodiments, the BS uses one or more parameters in the information message (20Y) to estimate a LOS (Line-of-Sight) or NLOS (Non-Line-of-Sight) channel state between the BS and the reference device. The BS may provide in response to a measurement request a measurement report including an indication on the LOS or NLOS channel state for one or more UL-RS originating from the reference device OR using information of the reference device to derive a LOS or NLOS indication for measurements on one or more UL-RS originating from the UE.

In the following, an example according to an embodiment is described, wherein in response to the configuration message 202, the BS provides information on an applied setting:

In accordance with embodiments, the BS may provide the LMF in response to (202) or in a measurement report an indication on applying one or more transmit and/or receive spatial filter(s) or beam direction(s) derived on (202). The indication may include one or more ID(s) of the UL and/or DL resources or a success indication on applying configuration (202) or an information on the applied beam direction at the BS for transmission and/or reception. The BS may indicate whether one or more ID(s) of DL-RS(s) or the UL-RS(s) are spatially associated with one or more ID(s) indicated in (202).

In accordance with embodiments, the BS may provide the LMF in response to (202) or in a measurement report an indication on updated selection of one or more transmit and/or receive spatial filter(s) or beam direction(s) selected by the BS and may include at least one parameter or indication different from (202). The indication may include one or ID(s) of the UL and/or DL resources OR an information on the applied beam direction at the BS for transmission and/or reception.

In the following, an example for a validation of the configuration message according to an embodiment is described:

In accordance with embodiments, the indication (202) may include validity information on at least one or more identifier(s), ID(s), of one or more UL resource(s) and/or UL resource set(s) and/or one or more DL resource(s) and/or one or more ID(s), of one or more DL resource(s) and/or DL resource set(s) to indicate at least a spatial filter or beam direction for the reception of one or more UL resource(s). The validation information may include an indication on the time the configuration (202) is valid (e.g. SFN, Hybrid-SFN, Slot, secs, system specific timestamp, etc.). The validation information may include an indication of one or more time window(s) during which the configuration (202) can be applied. The time window may include an indication on one or more occasions where the configuration is to be applied on aperiodic, semi-persistent or periodic UL-RS(s) for reception and/or DL-RS(s) for transmission.

In the following, a DL-Resource configuration according to embodiments is described: As particular examples of embodiments, three possible options are now described:

Option 1: step 1: BS informs the LMF on the DL resources (as in 201-b), step 2: LMF provides configuration for one or more resources, step 3: BS confirms or aborts.

Option 2: step 1: BS informs the LMF on a set of configurable DL resources (as in 201-b), step 2: LMF provides configuration for one or more resources, step 3: BS confirms or aborts.

Option 3: step 1: BS receives PRS utilization characteristics from the LMF; The BS provides the information on the configured DL RS resources according to these characteristics to the LMF.

In particular, illustrates the flowchart of a method to enable a beam direction configuration for BS-specific DL-RS(s). In particular, FIG. 7 illustrates an example of direction configuration for DL-RS (option 1). The base station may receive from the LMF a request to provide information on one or more DL-RS(s) configured at the base station. In response to this request the base station may provide the information or a configuration of one or more DL-RS(s). The provided information can be for example a part of the BS-Information-Item including the DL-RS configuration(s) as shown in Table 3. The information can include spatial direction information of one or more DL-RS resource set IDs or resource IDs. In one embodiment, the LMF uses the Spatial Direction Information received from a base station to generate a configuration indicating a spatial filter or beam direction for one or more DL-RS(s) or to update or reconfigure the direction or spatial setting(s) of one or more DL-RS(s).

TABLE 3

Example of a BS information provided to the LMF

| IE/Group Name | Presence | Range |
|---|---|---|
| BS ID | M | |
| BS Information Type | | 1 . . . <maxnoTRPInfoTypes> |
| >CHOICE TRP Information Item | M | |
| >>DL-RS Configuration | M | |
| >>DL-RS Information | M | |
| >>SFN Initialisation Time | M | |
| >>Spatial Direction Information | M | |
| >>Geographical Coordinates | M | |

In one embodiment, the base station receives a configuration message indicating a direction of one or more DL RS(s) at the base station where at least one of the indications corresponds to a DL-RS(s) ID provided by the BS to the LMF in a previous message.

In one embodiment, the BS may further receive a request to reconfigure one or more DL-RS(s) based on a previously received configuration message or on a simultaneous configuration and configuration request. The BS may respond to the LMF in case of a successful operation by confirming the configuration request or in case of an unsuccessful operation by signaling a failure message.

In one embodiment the base station may further receive a request to activate one or more DL-RS(s) based on a previously received configuration message or on a simultaneous configuration and configuration request. The base station may respond to the LMF in case of a successful operation by confirming the configuration request or in case of an unsuccessful operation by signaling a failure message.

The base station may receive from a network node, LMF a request in which to provide information on one or more DL-RS(s) configured at the BS. In response to this request the base station may provide information or a configuration of one or more reconfigurable DL-RS(s). In one embodiment, the LMF uses Information on the one or reconfigurable set(s) or one or more reconfigurable resources(s) received from the base station to generate a configuration indicating a spatial information or beam direction for an DL-RS(s) or indicating a spatial information or beam direction to update or reconfigure the direction or spatial setting of one or more of the DL-RS(s).

In one embodiment, the base station is configured by a network node, LMF to apply, desired DL-RS characteristics including the spatial information and/or beam direction information. In response to this message the base station may provide the configuration of one or more DL-RS(s) associated with the characteristics indicated in the message from the LMF.

In the following, a UE method and UE concepts according to embodiments are described:

The UE may receive from a network entity, information to perform a measurement on one or more DL-RS(s). The UE may receive a configuration of one or more UL-RS(s) from the same or a different entity. In one example, the entity configuring the UE can be a BS. The UE may receive an indication to perform a measurement on one or more DL-RS(s). The information for the DL-RS reception may include an indication on the spatial filter or receive direction of the DL-RS based on one or more UL-RS(s). The UE may use the spatial filter or beam direction derived from one or more UL RS(s) for a DL RS.

In some examples, the UE is configured to receive from a network node, LMF, or from a base station, via the PHY layer or a higher layer (e.g., RRC), at least one of the following messages: the UE may derive the spatial filter or beam direction to receive a DL RS 'P' from the spatial filter or beam direction used to transmit an UL RS or UL RS set 'S', or the UE may assume that the spatial filter or beam direction to transmit a DL RS 'P' by the base station is derived from the spatial filter or beam direction used to receive UL RS or RS set 'S' at the base station. This indication, for example, may be performed by providing a TCI-state reference for the DL RS 'P' with the UL RS or RS set 'S'—the DL RS 'P' may be provided a TCI-state with a QCL type 'D' association with UL RS 'S'.

In accordance with embodiments, a method performed by the user equipment, UE, comprising:

receiving a message from a network entity, LMF, comprising one or more configuration(s) for the reception of one or more DL-RS(s) associated with one or more serving or neighboring BS(s), receiving from the network entity, LMF, an indication including a transmit spatial filter information for one or more UL-RS(s), and determining the receive spatial filter(s) or beam direction(s) for the one or more DL-RS(s) using said one or more UL-RSs, and applying the receive spatial filter(s) or beam direction(s) for receiving one or more DL-RS(s) using said one or more UL-RSs.

The UE may receive from a network entity, LMF, information to perform a measurement on one or more DL-RS(s). The UE may receive from the same or a different entity, a configuration for an SL-RS (sidelink resource) transmission. In one example, the entity configuring the UE can be a BS. The UE may receive an indication perform a measurement on one or more SL-RS(s). The information for the DL-RS reception may include an indication on the spatial filter or receive direction from on one or more SL-RS(s).

In accordance with embodiments, a method performed by the user equipment, UE, is provided, comprising: receiving a message from a network entity comprising one or more configuration(s) for the reception of one or more DL-RS(s) for one or more serving or neighboring BS(s).

For example, the BSs may, e.g., apply one of the above provided base station concepts or one of the above provided methods for a BS, to get the DL-PRS.

receiving from the network entity, an indication including transmit spatial filter information on one or more sidelink, SL, RS(s)

determining the spatial filter(s) or beam direction(s) for receiving one or more DL-RS(s) using one or SL-RSs from the set of parameters.

In corresponding embodiments, the UE may correspond to a reference device. The reference device may provide its location to the network entity or its position is known at the network entity. The reference device with known location to support one or more of the following functionalities:

Measure DL-RS and report associated measurements (e.g., RSTD, Rx-Tx time difference, RSRP) to the LMF;

Transmit UL-RS and enable BSs to measure and report measurements (e.g., RTOA, Rx-Tx time difference, AOA) from the reference device to the LMF.

The UE may be requested to perform one or more positioning method(s) based on UL transmissions, such as UL-AoA or UL-TDoA. The UE may be configured for the transmission of one or more UL-RS resource(s) with an UL-RS configuration. The UE may be requested to perform one or more positioning method(s) based on DL transmission such DL-AoA or DL-TDoA. The UE may be provided with information on of one or more DL-RS(s) resource(s) for DL-RS reception. The UE may provide the LMF with an indication on whether one or more measurements on one or more DL-RS(s) at a given time are associated with one or more UL-RS(s).

In accordance with embodiments, in UE-assisted mode, the UE may provide the LMF with an indication on whether one or more measurements on one or more ID(s) of DL-RS(s) resource(s) or resource set(s) are spatially associated with one or more ID(s) of one or more UL-RS resource(s). The UE measurements may be an RSTD, RSRP, Rx-Tx, RSRP or any measurement performed by the UE on the DL-RS in UE-assisted mode.

In corresponding embodiments, in UE-assisted mode the UE may provide the LMF with an indication on whether one or more measurements on one or more ID(s) of DL-RS resource(s) or resource set(s) are associated with one or more ID(s) of one or more UL-RS resource(s) at a given time (e.g. timestamp).

In accordance with embodiments, in UE-based mode, the UE may receive from the LMF with an indication on whether one or more ID(s) of DL-RS(s) resource(s) or resource set(s) from one or more BSs are spatially associated with one or more ID(s) of one or more UL-RS resource(s).

The UE may be requested to perform one or more positioning method(s) based on UL transmission and DL reception such as multi-RTT. The UE may be configured for the transmission on one or more UL-RS(s) resource(s) with an UL-RS configuration(s) AND provided with information on of one or more DL-RS(s) resource(s) for DL-RS reception. The UE may provide the LMF with an indication on whether one or more Rx-Tx measurements on one or more DL-RS(s) at a given time are spatially associated with one or more UL-RS(s).

In accordance with embodiments, in UE-assisted mode, the UE may provide the LMF with an indication on whether one or more Rx-Tx measurements on one or more ID(s) of DL-RS(s) resource(s) or resource set(s) are spatially associated with one or more ID(s) of one or more UL-RS resource(s). The UE measurements may be an RSTD, RSRP, Rx-Tx, RSRP or any measurement performed by the UE on the DL-RS in UE-assisted mode.

In an embodiment, the UE may receive from the LMF with an indication on whether one or more Rx-Tx BS(s) measurement(s) are spatially associated with one or more ID(s) of one or more UL-RS resource(s).

In the following, a UE initiated request according to an embodiment is described.

The UE may perform measurements on DL-RS(s) and use the measurement results to request or recommend from the network entity to configure new DL-RS(s) or modify existing DL-RS(s) with certain spatial filter configuration(s) or beam direction(s). The UE may derive the spatial filter or beam direction to receive a DL RS from one or more DL RS of one or more BSs. The UE may provide the network entity with an indication on the spatial filter(s) or beam direction(s) for the one or more DL-RS(s). The network entity may use the information provided by the UE request to derive the configuration message (202).

LMF Method

In accordance with embodiments, a network entity of a wireless communication system for providing transmit or receive spatial filter information, wherein the network entity is configured to receive information from a first base station and/or a measurement report from a second base station including measurements of an Uplink transmission by a uplink resource transmitted from one or more user equipment(s)

to determine direction information depending on the information and/or depending on the measurement report;

to map the direction information for one or more uplink resources and/or one or more downlink resources;

In accordance with embodiments, a network entity of a wireless communication system for providing transmit or receive spatial filter information, wherein the network entity is configured to receive information from a first base station and/or a measurement report from a measurement device including measurements of a downlink transmission by a downlink resource transmitted from a second base station to determine direction information depending on the information and/or depending on the measurement report;

to map the direction information for one or more uplink resources and/or one or more downlink resources;

In corresponding embodiments, the network entity to provide a message to the second base station comprising an indication of one or more spatial filters or one or more beam directions for one or more downlink transmissions by one or more downlink resources and/or for one or more uplink receptions by one or more uplink resources; and/or In corresponding embodiments, the network to provide a message to a user equipment of the wireless communication system, wherein the message comprises one or more configurations indicating the transmit spatial filter information on one or more uplink resources, wherein the message comprises information on one or more spatial filters or one or more beam directions for receiving one or more downlink transmissions by one or more downlink resources.

In accordance with embodiments, a method performed by a network node, LMF (500), is provided. The method comprises:

receiving information from a first BS and/or a measurement report from a measurement device including measurements of a DL RS transmitted from a second BS;

determining direction information based on the information and/or the measurement report;

mapping the direction information for at least one UL resource or/and DL resource; and providing a message (202) to the second BS, wherein the message (202) comprises an indication of at least a spatial filter or beam direction for transmission of one or more downlink, DL, resource(s) and/or reception of one or more uplink, UL, resource(s);

or providing the UE with a message (402) comprising one or more configuration(s) indicating at least one transmit spatial filter information on one or more UL-RS(s); and enable a UE using this information for determining the spatial filter(s) or beam direction(s) for receiving one or more DL-RS(s) using one or UL-RSs from the set of parameters.

In accordance with embodiments, a method performed by a network node, for providing transmit spatial filter information, wherein the network entity is configured to receive information from a first base station and/or a measurement report from a second base station including measurements of an Uplink transmission by a uplink resource transmitted from one or more user equipment(s)

to determine direction information depending on the information and/or depending on the measurement report;

to map the direction information for one or more uplink resources and/or one or more downlink resources;

to provide a message to the second base station comprising an indication of one or more spatial filters or one or more beam directions for one or more downlink transmissions by one or more downlink resources and/or for one or more uplink receptions by one or more uplink resources; and/or to provide a message to a user equipment of the wireless communication system, wherein the message comprises one or more configurations indicating the transmit spatial filter information on one or more uplink resources, wherein the message comprises information on one or more spatial filters or one or more beam directions for receiving one or more downlink transmissions by one or more downlink resources.

Although some aspects of the described concept have been described in the context of an apparatus, it is clear that these aspects also represent a description of the corresponding method, where a block or a device corresponds to a method step or a feature of a method step. Analogously, aspects described in the context of a method step also represent a description of a corresponding block or item or feature of a corresponding apparatus.

Various elements and features of the present invention may be implemented in hardware using analog and/or digital circuits, in software, through the execution of instructions by one or more general purpose or special-purpose processors, or as a combination of hardware and software. For example, embodiments of the present invention may be implemented in the environment of a computer system or another processing system. FIG. 8 illustrates an example of a computer system 600. The units or modules as well as the steps of the methods performed by these units may execute on one or more computer systems 600. The computer system 600 includes one or more processors 602, like a special purpose or a general-purpose digital signal processor. The processor 602 is connected to a communication infrastructure 604, like a bus or a network. The computer system 600 includes a main memory 606, e.g., a random-access memory, RAM, and a secondary memory 608, e.g., a hard disk drive and/or a removable storage drive. The secondary memory 608 may allow computer programs or other instructions to be loaded into the computer system 600. The computer system 600 may further include a communications interface 610 to allow software and data to be transferred between computer system 600 and external devices. The communication may be in the from electronic, electromagnetic, optical, or other signals capable of being handled by a communications interface. The communication may use a wire or a cable, fiber optics, a phone line, a cellular phone link, an RF link and other communications channels 612.

The terms "computer program medium" and "computer readable medium" are used to generally refer to tangible storage media such as removable storage units or a hard disk installed in a hard disk drive. These computer program products are means for providing software to the computer system 600. The computer programs, also referred to as computer control logic, are stored in main memory 606 and/or secondary memory 608. Computer programs may also be received via the communications interface 610. The computer program, when executed, enables the computer system 600 to implement the present invention. In particular, the computer program, when executed, enables processor 602 to implement the processes of the present invention, such as any of the methods described herein. Accordingly, such a computer program may represent a controller of the computer system 600. Where the disclosure is implemented using software, the software may be stored in a computer program product and loaded into computer system 600 using a removable storage drive, an interface, like communications interface 610.

The implementation in hardware or in software may be performed using a digital storage medium, for example cloud storage, a floppy disk, a DVD, a Blue-Ray, a CD, a ROM, a PROM, an EPROM, an EEPROM or a FLASH memory, having electronically readable control signals stored thereon, which cooperate or are capable of cooperating with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention may be implemented as a computer program product with a program code, the program code being operative for performing one of the methods when the computer program product runs on a computer. The program code may for example be stored on a machine readable carrier.

Other embodiments comprise the computer program for performing one of the methods described herein, stored on a machine readable carrier. In other words, an embodiment of the inventive method is, therefore, a computer program having a program code for performing one of the methods described herein, when the computer program runs on a computer.

A further embodiment of the inventive methods is, therefore, a data carrier or a digital storage medium, or a computer-readable medium comprising, recorded thereon, the computer program for performing one of the methods described herein. A further embodiment of the inventive method is, therefore, a data stream or a sequence of signals representing the computer program for performing one of the methods described herein. The data stream or the sequence of signals may for example be configured to be transferred via a data communication connection, for example via the Internet. A further embodiment comprises a processing means, for example a computer, or a programmable logic device, configured to or adapted to perform one of the methods described herein. A further embodiment comprises a computer having installed thereon the computer program for performing one of the methods described herein.

In some embodiments, a programmable logic device, for example a field programmable gate array, may be used to perform some or all of the functionalities of the methods described herein. In some embodiments, a field programmable gate array may cooperate with a microprocessor in order to perform one of the methods described herein. Generally, the methods may be performed by any hardware apparatus.

While this invention has been described in terms of several embodiments, there are alterations, permutations, and equivalents which will be apparent to others skilled in the art and which fall within the scope of this invention. It should also be noted that there are many alternative ways of implementing the methods and compositions of the present invention. It is therefore intended that the following appended claims be interpreted as including all such alterations, permutations, and equivalents as fall within the true spirit and scope of the present invention.

REFERENCES

| | |
|---|---|
| RRC | TS38.331 v16.1.0 |
| LPP | TS37.355 v16.1.0 |
| NRPPa | TS38.455 v16.0.0 |

ABBREVIATIONS

| Abbreviation | Definition |
|---|---|
| 3GPP | third generation partnership project |
| 5GC | 5G core network |
| BS | base station |
| CSI-RS | channel state information reference signal |
| DMRS | demodulation reference signal |
| DOA | direction of arrival |
| E-CID | enhanced cell ID |
| eNB | evolved node b |
| E-SMLC | evolved serving mobile location center. |
| E-UTRA | evolved UMTS terrestrial radio access |
| gNB | next generation node-b |
| GPS | Global Positioning System |
| LMF | location management function |
| LMU | location measurement unit |
| LPP | LTE positioning protocol |
| LTE | Long-term evolution |
| NG | next generation |
| ng-eNB | next generation eNB |
| NG-RAN | either a gNB or an ng-eNB |
| NR | new radio |
| NRPPa | new radio positioning protocol a |
| OPC UA | Open Platform Communication Unified Architecture |
| OTDOA | observe time difference of arrival |
| PRS | position reference signal |
| PTRS | phase tracking reference signal |
| QCL | quasi colocation |
| RAN | radio access network |
| RP | reception point |
| RSTD | reference signal time difference |
| RTOA | relative time of arrival |
| RTT | round trip time |
| SA | Standalone |
| SRS | sounding reference signal |
| TDM | Time Domain Multiplexing |
| TOF | time of flight |
| TRP | transmission reception point |
| RS | reference signal |
| QCL | quasi co-located |
| AoA | Angle of Arrival |
| AoD | Angle of Departure |
| PAS | Power Angular Spectrum |
| NR | New Radio |

The invention claimed is:

1. An apparatus for transmitting and receiving data in a wireless communication system, wherein the apparatus is a user equipment, wherein the apparatus is configured to receive a message from a further network entity, wherein the apparatus is configured to determine one or more transmit spatial filters and/or one or more receive spatial filters and/or one or more beam directions; wherein the one or more transmit spatial filters and/or the one or more receive spatial filters are identical to at least one initial spatial filter or are derived by the apparatus from the at least one initial spatial filter; wherein the one or more beam directions are identical to at least one initial beam direction or are derived by the apparatus from the at least one initial beam direction; and wherein the apparatus is configured to apply the one or more transmit spatial filters and/or the one or more beam directions on one or more uplink resources; and/or wherein the apparatus is configured to apply the one or more receive spatial filters and/or the one or more beam directions on one or more downlink resources;

wherein the message comprises directional angle information indicating a beam direction for at least one of the one or more beam directions, wherein the message comprises directional angle information indicating in a geographic coordinate system or in a local coordinate system the following information:

an azimuth angle and an azimuth angle uncertainty indicating an azimuth angle uncertainty range; and an elevation angle and an elevation angle uncertainty indicating an elevation angle uncertainty range, wherein the apparatus is configured to determine an actual azimuth angle of departure using the azimuth angle and the azimuth angle uncertainty of the directional angle information of the message; and wherein the apparatus is configured to determine an actual zenith angle of departure using the elevation angle and the elevation angle uncertainty of the directional angle information of the message.

2. The apparatus according to claim 1, wherein the apparatus is configured to reduce its search space for searching the actual azimuth angle of departure using the azimuth angle and the azimuth angle uncertainty of the directional angle information of the message; and wherein the apparatus is configured to reduce its search space for searching the actual zenith angle of departure using the elevation angle and the elevation angle uncertainty of the directional angle information of the message.

3. The apparatus according to claim 2, wherein the apparatus is configured to reduce its search space for searching the actual azimuth angle of departure to the range:

$$[\varphi AOA - \Delta\varphi AOA/2, \varphi AOA + \Delta\varphi AOA/2],$$

wherein $\varphi AOA$ indicates the azimuth angle of the directional angle information of the message, wherein $\Delta\varphi AOA$ indicates the azimuth angle uncertainty of the directional angle information of the message; and wherein the apparatus is configured to reduce its search space for searching the actual zenith angle of departure to the range:

$$[\theta AOA - \Delta\theta AOA/2, \theta AOA - \Delta\theta AOA/2],$$

wherein $\theta AOA$ indicates the elevation angle of the directional angle information of the message, wherein $\Delta\theta AOA$ indicates the elevation angle uncertainty of the directional angle information of the message.

4. The apparatus according to claim 1, wherein the message comprises information indicating in a map projection area in a geographic Coordinate System or in a Local Coordinate System or a relative geodetic location comprising one or more of the following information:

X,Y,Z unit values, an X value, a Y value, a Z value, an area uncertainty or confidence, an area uncertainty or confidence type, or one or more of the following location information:

one or more degrees of latitude, one or more degrees of longitude, an altitude, a delta latitude, a delta longitude, a delta height, an uncertainty or confidence.

5. The apparatus according to claim 1, wherein the apparatus is configured to receive a further information message, preceding or following the message, wherein the further information message indicates whether the one or more uplink resources or one or more uplink resource sets and/or the one or more downlink resource or one or more downlink resource sets are originating from and/or targeting to a reference device.

6. The apparatus according to claim 5, wherein the further information message comprises one or more of the following parameters:

one or more identifiers of the one or more uplink resources and/or the one or more uplink resource sets associated with a reference device, one or more identifiers of the one or more downlink resources and/or the one or more downlink resource sets associated with the reference device, an indication on the reference device type, position information of the reference device, directional information of the reference device.

7. The apparatus according to claim 5, wherein the apparatus is configured to use the further information message to estimate a Line-of-Sight or Non-Line-of-Sight channel state between the apparatus and the reference device.

8. The apparatus according to claim 1, wherein in response to the message, the apparatus is configured to provide to the further network entity an indication on applying the one or more transmit spatial filters and/or the one or more receive spatial filters and/or the one or more beam directions.

9. The apparatus according to claim 8, wherein the indication on applying the one or more transmit spatial filters and/or the one or more receive spatial filters and/or the one or more beam directions comprises one or more identifiers of the one or more uplink resources and/or the one or more downlink resources, or a success indication on applying a configuration, or an information on an applied beam direction at the apparatus for transmission and/or reception.

10. The apparatus according to claim 1, wherein the apparatus is configured to provide to the network an indication on an updated selection of the one or more transmit spatial filters and/or the one or more receive spatial filters or the one or more beam directions selected by the apparatus.

11. The apparatus according to claim 1, wherein the message comprises validity information on one or more identifiers of the one or more uplink resources and/or on the one or more uplink resource sets, and/or information on one or more identifiers of one or more downlink resources and/or one or more downlink resource sets to indicate the at least one initial spatial filter or the at least one initial beam directions for the reception of one or more uplink resources.

12. The apparatus according to claim 1, wherein the validity information comprises an indication on a time when the configuration is valid, and/or an indication on one or more time windows during which the configuration is applicable.

13. A method, executed by an apparatus, for transmitting and receiving data in a wireless communication system, wherein the apparatus is a user equipment, wherein the method comprises:

receiving, by the apparatus, a message from a further network entity, determining, by the apparatus, one or more transmit spatial filters and/or one or more receive spatial filters and/or one or more beam directions; wherein the one or more transmit spatial filters and/or the one or more receive spatial filters are identical to at least one initial spatial filter or are derived by the apparatus from the at least one initial spatial filter; wherein the one or more beam directions are identical to at least one initial beam direction or are derived by the apparatus from the at least one initial beam direction; and applying, by the apparatus, the one or more transmit spatial filters and/or the one or more beam directions on one or more uplink resources; and/or applying, by the apparatus, the one or more receive spatial filters and/or the one or more beam directions on one or more downlink resources;

wherein the message comprises directional angle information indicating a beam direction for at least one of the one or more beam directions, wherein the message comprises directional angle information indicating in a geographic coordinate system or in a local coordinate system the following information:

an azimuth angle and an azimuth angle uncertainty indicating an azimuth angle uncertainty range; and an elevation angle and an elevation angle uncertainty indicating an elevation angle uncertainty range, wherein the method comprises determining an actual azimuth angle of departure using the azimuth angle and the azimuth angle uncertainty of the directional angle information of the message; and wherein the method comprises determining an actual zenith angle of departure using the elevation angle and the elevation angle uncertainty of the directional angle information of the message.

14. The method according to claim 13, wherein the method comprises reducing a search space for searching the actual azimuth angle of departure using the azimuth angle and the azimuth angle uncertainty of the directional angle information of the message; and wherein the method comprises reducing the search space for searching the actual zenith angle of departure using the elevation angle and the elevation angle uncertainty of the directional angle information of the message.

15. The method according to claim 14, wherein the method comprises reducing the search space for searching the actual azimuth angle of departure to the range:

$$[\varphi AOA - \Delta \varphi AOA/2, \varphi AOA - \Delta \varphi AOA/2],$$

wherein $\varphi AOA$ indicates the azimuth angle of the directional angle information of the message, wherein $\Delta \varphi AOA$ indicates the azimuth angle uncertainty of the directional angle information of the message; and wherein the method comprises reducing the search space for searching the actual zenith angle of departure to the range:

$$[\theta AOA - \Delta \theta AOA/2, \theta AOA - \Delta \theta AOA/2],$$

wherein $\theta AOA$ indicates the elevation angle of the directional angle information of the message, wherein $\Delta \theta AOA$ indicates the elevation angle uncertainty of the directional angle information of the message.

16. A non-transitory digital storage medium having stored thereon a computer program for performing a method, executed by an apparatus, for transmitting and receiving data in a wireless communication system, wherein the apparatus is a user equipment, the method comprising:

receiving, by the apparatus, a message from a further network entity, determining, by the apparatus, one or more transmit spatial filters and/or one or more receive spatial filters and/or one or more beam directions; wherein the one or more transmit spatial filters and/or the one or more receive spatial filters are identical to at least one initial spatial filter or are derived by the apparatus from the at least one initial spatial filter; wherein the one or more beam directions are identical to at least one initial beam direction or are derived by the apparatus from the at least one initial beam direction; and applying, by the apparatus, the one or more transmit spatial filters and/or the one or more beam directions on one or more uplink resources; and/or applying, by the apparatus, the one or more receive spatial filters and/or the one or more beam directions on one or more downlink resources;

wherein the message comprises directional angle information indicating a beam direction for at least one of the one or more beam directions, wherein the message comprises directional angle information indicating in a geographic coordinate system or in a local coordinate system the following information:

an azimuth angle and an azimuth angle uncertainty indicating an azimuth angle uncertainty range; and an elevation angle and an elevation angle uncertainty indicating an elevation angle uncertainty range, wherein the method comprises determining an actual azimuth angle of departure using the azimuth angle and the azimuth angle uncertainty of the directional angle information of the message; and wherein the method comprises determining an actual zenith angle of departure using the elevation angle and the elevation angle uncertainty of the directional angle information of the message, when said computer program is run by a computer.

* * * * *